US008927618B2

(12) United States Patent
Goto et al.

(10) Patent No.: US 8,927,618 B2
(45) Date of Patent: Jan. 6, 2015

(54) DYE COMPOSITION FOR OPHTHALMIC LENS, METHOD FOR PRODUCING COLORED OPHTHALMIC LENS USING THE SAME, AND COLORED OPHTHALMIC LENS

(75) Inventors: Yuji Goto, Kasugai (JP); Ichiro Ando, Kasugai (JP); Ryo Matsushita, Kasugai (JP)

(73) Assignee: Menicon Co., Ltd., Nagoya-shi (JP)

(*) Notice: Subject to any disclaimer, the term of this patent is extended or adjusted under 35 U.S.C. 154(b) by 69 days.

(21) Appl. No.: 12/927,564

(22) Filed: Nov. 18, 2010

(65) Prior Publication Data

US 2011/0116034 A1 May 19, 2011

(30) Foreign Application Priority Data

Nov. 18, 2009 (JP) ................................ 2009-263381
Feb. 10, 2010 (JP) .................................. 2010-28222

(51) Int. Cl.
*G02B 1/10* (2006.01)
*C09B 69/10* (2006.01)
*G02B 1/04* (2006.01)

(52) U.S. Cl.
CPC ............. *C09B 69/106* (2013.01); *C09B 69/101* (2013.01); *C09B 69/108* (2013.01); *G02B 1/043* (2013.01)
USPC ....... 523/106; 351/159.24; 427/162; 427/487

(58) Field of Classification Search
None
See application file for complete search history.

(56) References Cited

U.S. PATENT DOCUMENTS

| 4,981,487 | A | * | 1/1991 | da Costa ........................... 8/507 |
| 5,528,322 | A | * | 6/1996 | Jinkerson ................. 351/159.62 |
| 6,315,410 | B1 | * | 11/2001 | Doshi ...................... 351/159.25 |
| 6,834,955 | B2 | * | 12/2004 | Doshi ...................... 351/159.74 |
| 6,880,932 | B2 | * | 4/2005 | Doshi ...................... 351/159.24 |
| 7,048,375 | B2 | * | 5/2006 | Doshi et al. ............. 351/159.25 |
| 7,165,840 | B2 | * | 1/2007 | Yokoyama et al. ...... 351/159.74 |
| 7,267,846 | B2 | * | 9/2007 | Doshi et al. ................... 427/466 |

(Continued)

FOREIGN PATENT DOCUMENTS

| EP | 0 396 376 | 11/1990 |
| EP | 0 666 289 | 8/1995 |

(Continued)

OTHER PUBLICATIONS

Scoutaris et al, Inkjet printing as a novel medicine formulation technique, 2011, Elsevier, Journal of Controlled Release, 156, pp. 179-185.*

(Continued)

*Primary Examiner* — James J Seidleck
*Assistant Examiner* — Peter A Salamon
(74) *Attorney, Agent, or Firm* — Oliff PLC

(57) ABSTRACT

The present invention provides a dye composition for an ophthalmic lens, which is a dye composition used for dyeing an ophthalmic lens with an ink-jet coating equipment, characterized by the composition including: (A) a dye having at least one group having a carbon-carbon double bond selected from an α,β-unsaturated carbonyl group, a styryl group, a vinylbenzyl group and an allyl group per molecule; (B) a radical polymerization initiator; and (C) a solvent capable of dissolving at least a part of the component (A) and the component (B), and/or (D) a monomer having at least one radical polymerizable group per molecule.

9 Claims, 13 Drawing Sheets

(56) References Cited

U.S. PATENT DOCUMENTS

| | | | |
|---|---|---|---|
| 7,549,742 B2* | 6/2009 | Doshi | 351/159.25 |
| 7,879,267 B2* | 2/2011 | Turner et al. | 264/1.7 |
| 2002/0030788 A1* | 3/2002 | Doshi | 351/162 |
| 2003/0052424 A1* | 3/2003 | Turner et al. | 264/1.32 |
| 2003/0071964 A1* | 4/2003 | Doshi | 351/159 |
| 2004/0044099 A1* | 3/2004 | Tucker et al. | 523/160 |
| 2004/0130676 A1* | 7/2004 | Doshi et al. | 351/162 |
| 2004/0197562 A1* | 10/2004 | Soane et al. | 428/411.1 |
| 2005/0075453 A1* | 4/2005 | Mathauer et al. | 524/801 |
| 2005/0168688 A1* | 8/2005 | Doshi et al. | 351/162 |
| 2005/0272833 A1* | 12/2005 | Doshi | 523/160 |
| 2006/0126016 A1* | 6/2006 | Yokoyama et al. | 351/177 |
| 2008/0062381 A1* | 3/2008 | Doshi et al. | 351/161 |

FOREIGN PATENT DOCUMENTS

| | | |
|---|---|---|
| EP | 0 799 864 | 10/1997 |
| EP | 1 043 365 | 10/2000 |
| EP | 1 657 041 | 5/2006 |
| EP | 1 666 537 | 6/2006 |
| EP | 1 834 997 | 9/2007 |
| EP | 1 867 683 | 12/2007 |
| JP | 63-264719 | 11/1988 |
| JP | 64-010045 | 1/1989 |
| JP | 1-299560 | 12/1989 |
| JP | 4-270312 | 9/1992 |
| JP | 5-257096 | 10/1993 |
| JP | 8-112566 | 5/1996 |
| JP | 08112566 A * | 5/1996 ............... B05D 1/02 |
| JP | 9-020873 | 1/1997 |
| JP | 2003-515787 | 5/2003 |
| JP | 2004-038107 | 2/2004 |
| JP | 2005-156629 | 6/2005 |
| JP | 2009-262482 | 11/2009 |
| WO | WO-99/12058 | 3/1999 |
| WO | WO-01/40846 | 6/2001 |
| WO | WO-2005/016617 | 2/2005 |
| WO | WO-2006/074843 | 7/2006 |
| WO | WO-2009/004485 | 4/2009 |
| WO | WO-2009/102454 | 8/2009 |

OTHER PUBLICATIONS

Database WPI Week 199713 Thomson Scientific, London, GB; AN 1997-140971 XP002634371, & JP 9-020873 A. (Tomei KK) Jan. 21, 1997.

* cited by examiner

DYE COMPOSITION FOR OPHTHALMIC LENS, METHOD FOR PRODUCING COLORED OPHTHALMIC LENS USING THE SAME, AND COLORED OPHTHALMIC LENS

TECHNICAL FIELD

The present invention relates to a dye composition for an ophthalmic lens, a method for producing a colored ophthalmic lens using the same and a colored ophthalmic lens.

BACKGROUND ART

In the field of ophthalmic lenses, particularly contact lenses, numbers for showing the specifications, etc., are printed on a part of the lens in order to identify specifications such as dioptric powers of contact lenses to manage during their production, distribution and sales. In addition, for easy distinction between the front and back surfaces of the lens, numbers, characters, figures, and the like are similarly printed for indication. Furthermore, in light of esthetic preference, a contact lens colored to provide an iris pattern may be used for patients who have defected iris of an eye due to a disease, injury or the like such that a natural appearance is achieved by printing a contact lens to imitate colors and shapes of the iris of human eyes. Alternatively, in light of fashion-oriented aspects, contact lenses having varying iris color are also highly demanded. Thus subjecting an ophthalmic lens to marking or dyeing is an important feature in producing such a lens.

Conventionally, known methods for printing characters, numbers, figures and the like on an ophthalmic lens include a pad printing method and a screen printing methods in which a dye composition for an ophthalmic lens containing a dye or a pigment is used, and the like. In the pad printing method, an ink solution is retained in recessed grooves formed by engraving characters and the like to be marked, and the ink solution is transferred to a pad, which pad carrying the ink is then brought into contact with a substrate to execute printing. In the screen printing method, a mesh is laid over holes having the shapes of the characters, numbers, figures, etc., and then the mesh is bonded with compression on the substrate, followed by applying a dye composition for an ophthalmic lens from above thereof to execute printing to provide desired shapes at specific sites. However, these methods are accompanied by disadvantages as in the following. For example, when marks are printed on desired positions of an ophthalmic lens such as a contact lens by the pad printing method, it is necessary to provide grooves corresponding to the shapes of the numbers and characters to be printed by etching on the base such as a metal beforehand. Such etching requires a considerable time period, and thus making stable supply of the base difficult. In addition, according to the screen printing method, it is necessary to produce holes having the shapes of the numbers, character, etc., to be printed beforehand using an emulsion or the like, which process also necessitates a considerable long time period similarly. Moreover, when a contact lens is actually printed by, for example, these methods, compression bonding of the pad or screen to the contact lens is necessary so as not to be movable; however, this operation requires a fixation device or jig for exclusive use for permitting the compression bonding. In the case of the screen printing method, for example, it is necessary to fix the screen while pulling it to complete compression bonding of the same on the contact lens, and thus a large device is required. Moreover, it is necessary to provide screens for dyeing and etching bases for each different character, number, and figure. In addition, since the device must be repeatedly assembled every printing step of each contact lens, or every batchwise printing step, leading to involvement of a very complicated step. Therefore, according to the pad printing method or the screen printing method, the number which can be processed is limited resulting from necessity for adjustment of the device and complexity of production steps for the method, thereby leading to increase in the cost, as well as needs for additional labor for control and management in connection with the device and the steps, and the like. Furthermore, the variance of the amount of applied ink, and the variance of the compression bonding properties of the ink, may result in poor transfer of the ink, or sometimes may lead to blurring of the printing, or deterioration of sharpness of the printing.

Thus, in place of the pad printing method and screen printing method, a method for marking with an ink-jet coating equipment has been proposed. An ink-jet coating equipment applies a dyeing solution in the form of extremely fine droplets on the face to be dyed, and the droplet attached on the surface form one dot. Thus, assembly of the dots enables a pattern having a desired character, number or figures to be formed. Generally, a character, number, or figure when formed with small dots assembled with a high density gives a sharp contrast to provide a mark that is superior in visibility. When printing or drawing is carried out using an ink-jet coating equipment, the size of the droplet, and the point where the droplet attaches, and the like can be accurately controlled by a computer or the like. The shape and the size of the mark can be easily changed by alteration, etc., of the computer program. In addition, it is also possible to print a plurality of dyes at the same time by using a plurality of ink jet nozzles, whereby superior characteristic feature is achieved in that various color formation and the like can be easily conducted, accompanied by excellent color contrast. Therefore, in printing using an ink-jet coating equipment, it is not necessary to provide a mold or screen engraved for different characters, numbers, figures, respectively, as in the pad printing method and the screen printing method. Moreover, the printing with an ink-jet coating equipment is based on a method of a non-contact type and does not require an extra step for allowing the pad or screen to be contacted or compression bonded; therefore, a superior advantage enabling to realize printing with very high productivity, and with a constantly high quality is achieved. In view of such advantages of the ink-jet coating equipment, some methods for marking an ophthalmic lens such as a contact lens have been disclosed.

Japanese Unexamined Patent Application, Publication No. H8-112566 discloses a method for printing a dye composition for an ophthalmic lens on a desired part of a hydrous contact lens with an ink-jet coating equipment. This document shows that use of an ink-jet coating equipment enables marking that is superior in workability is enabled. However, the document discloses use of a reactive dye, a pad dye or the like as the dye composition for an ophthalmic lens. When marking or dyeing is carried out on an ophthalmic lens such as a contact lens, it is necessary to prevent elution of the dye from the marking site in light of securement of the safety in eyes since these ophthalmic lenses are used by bringing into direct contact with the eyes. Furthermore, contact lenses, particularly hydrous soft contact lenses are swollen by immersion in water during storage, or during use, and as needed must be subjected to a treatment such as boiling or washing. It is necessary to prevent elution of the dye from the marking site in light of the qualitative durability, even if the contact lenses are thus swollen with water, or subjected to a treatment such as boiling or washing multiple times. However, the reactive dyes among the dyes used according to the prior art described above must have an active group, which can react with the dye, in the chemical structure of the material of the ophthalmic lens, and the dye may be eluted outside due to lack of the reaction of the dye in the case of the ophthalmic lens material not having an active group that can react with such a reactive dye. Therefore, the reactive dye disclosed in the prior art is disadvantageous in limitation of the type of applicable ophthalmic lens materials. On the other hand, when a pad dye is used, it is usually converted into a reduced state by making an alkali solution to prepare a dye solution; however, such a solution is readily oxidized in the air to be an insoluble substance. Therefore, the dye may be hardened within a discharge nozzle of an ink-jet coating equipment, whereby clogging may be caused. In order to prevent such events, an operation under an inert environment is required, and thus apparatuses and facilities enabling production or packing of an ink and application by an ink jet system in an inert environment would be necessary, leading to involvement of disadvantages in production such as necessity of significant costs. Additionally, there exist problems of economical efficiency and environmental aspects since an alkali solution and a fixing solution must be used in the case of the pad dye, due to a considerable expense required for a treatment of unwanted solutions (waste product) after the operation, and the like.

A dye composition has not been developed which is hardly accompanied by elution of the dye even in an ophthalmic lens in which its material does not have a group that can react with the reactive dye, when the lens is produced by a method for producing a colored ophthalmic lens using an ink-jet coating equipment. Furthermore, there is no economically and environmentally conscious method for producing a colored ophthalmic lens which can avoid use of a large quantity of an alkali solution and fixing solution, under current circumstances.

SUMMARY OF THE INVENTION

Problems to be Solved by the Invention

The present invention was made for solving the foregoing problems. Accordingly, an object of the present invention is to provide: a dye composition for an ophthalmic lens that enables to carry out stable dyeing simply in am economically and environmentally conscious manner, and is applicable for dyeing with an ink-jet coating equipment; a method for producing a colored ophthalmic lens; and an ophthalmic lens using the method for producing.

Means for Solving the Problems

An aspect of the invention accomplished for solving the foregoing problems provides a dye composition for an ophthalmic lens, which is a dye composition used for dyeing an ophthalmic lens with an ink-jet coating equipment, characterized by the composition including:

(A) a dye having at least one group having a carbon-carbon double bond selected from the group consisting of an α,β-unsaturated carbonyl group, a styryl group, a vinylbenzyl group and an allyl group per molecule;

(B) a radical polymerization initiator; and (C) a solvent capable of dissolving at least a part of the component (A) and the component (B) (hereinafter, may be referred to as "solvent (C)"), and/or (D) a monomer having at least one radical polymerizable group per molecule (hereinafter, may be referred to as "monomer (D)").

Since the dye composition for an ophthalmic lens includes in addition to a dye having at least one group having a specific carbon-carbon double bond per molecule and a radical polymerization initiator, a solvent capable of dissolving at least a part of these and/or a radical polymerizable monomer, a dyed printing (hereinafter, may be referred to as "cured matter") that is extremely superior in elution resistance (semipermanently stable with seldom elution) can be formed on an ophthalmic lens. The dyed printing formed from the dye composition for an ophthalmic lens has extremely high durability without elution of the dye even if swollen with water, or upon boiling or washing. It is believed that such superior elution resistance is achieved by polymerization of the dye molecules in the network structure of the polymer consisting the ophthalmic lens via a radical reaction of the dye molecules by way of an electromagnetic wave or heat, or tight fixation of the dye molecules on the ophthalmic lens via a graft reaction with the polymer consisting the ophthalmic lens. This effect is similarly achieved also with an ophthalmic lens not having a group that can react with a reactive dye. In addition, the dye composition for an ophthalmic lens is used for printing on an ophthalmic lens using an ink-jet coating equipment since it enables convenient dyeing by merely allowing the dye composition to be cured and fixed by means of an electromagnetic wave or heat, without using a large quantity of an alkali solution or fixing solution.

The dye composition for an ophthalmic lens may be used according to an embodiment not containing the monomer (D). Accordingly, even when the dye composition for an ophthalmic lens does not contain a radical polymerizable monomer, a dyed printing that is extremely superior in elution resistance can be formed on the ophthalmic lens, and convenient dyeing is enabled by merely allowing the dye composition to be cured and fixed by means of an electromagnetic wave or heat.

The dye composition for an ophthalmic lens is preferably in the form of a homogenous solution. By thus making the dye composition have the form of a homogenous solution, clogging in the discharge nozzle can be effectively prevented in printing on the ophthalmic lens using an ink-jet coating equipment, and a favorable dyed printing can be obtained. In addition, the dye composition in the form of a homogenous solution can be permeated easily and uniformly into the ophthalmic lens.

In the dye composition for an ophthalmic lens, when the group having a carbon-carbon double bond of the component (A) is an α,β-unsaturated carbonyl group, this group is preferably a (meth)acrylate group or a (meth)acrylamide group. By selecting these groups as the group having a carbon-carbon double bond of the component (A), elution resistance for the ophthalmic lens, and printing characteristics on the ophthalmic lens of the dye composition can be even more improved.

It is preferred that the dye composition for an ophthalmic lens further contains (E) a surfactant. By thus including a surfactant in the dye composition for an ophthalmic lens, permeation rate and homogeneity of this dye composition into/in the ophthalmic lens in printing can be improved.

The method for producing a colored ophthalmic lens according to the present invention including the following steps of:

(1) a coating step of coating the dye composition for an ophthalmic lens on the surface of an ophthalmic lens using an ink-jet coating equipment;

(2) a permeation step of allowing at least a part of the coated dye composition for an ophthalmic lens to be permeated into the ophthalmic lens; and (3) a polymerization step of polymerizing the dye composition for an ophthalmic lens by applying an active energy ray and/or heat to the dye composition for an ophthalmic lens.

Accordingly, since a dye composition for an ophthalmic lens containing each of the components (A), (B), and (C) and/or (D) described above is used in the method for producing a colored ophthalmic lens, it enables dyed printing that is extremely superior in elution resistance to be formed on any ophthalmic lens involving those not having a group that can react with a reactive dye. In addition, since the dye composition for an ophthalmic lens each of the aforementioned components is used and use of an alkali solution or fixing solution is not necessary according to the method for producing a colored ophthalmic lens, the amount of waste can be reduced, and dyeing can be carried out simply in am economically and environmentally conscious manner. In other words, the production method is believed to be a method that is superior in all terms of workability, convenience, economical efficiency, and environmental aspect.

In the step (2) of the method for producing a colored ophthalmic lens, after completing permeation of the entirety of the coated dye composition for an ophthalmic lens into the ophthalmic lens, an active energy ray and/or heat may be applied to the dye composition for an ophthalmic lens for polymerizing the dye composition for an ophthalmic lens. Accordingly, by applying an electromagnetic wave or heat in the state in which the entirety of the coated dye composition is permeated into the ophthalmic lens, a polymer network structure is formed, whereby the dye is fixed inside the ophthalmic lens. The polymer network structure of the dye composition forms an interpenetrating network structure with the polymer of the ophthalmic lens network structure, and thus a printing that is very stable to solvents and the like can be obtained by strong fixation of these with each other.

In the step (2) of the method for producing a colored ophthalmic lens, an active energy ray and/or heat may be applied to the dye composition for an ophthalmic lens for polymerizing the dye composition for an ophthalmic lens in the state in which a part of the coated dye composition for an ophthalmic lens is permeated into the ophthalmic lens, and the rest forms an interface with the ambient air. Also in this case, a part of the dye composition permeated into the ophthalmic lens forms an interpenetrating network structure with the polymer of the ophthalmic lens network structure. Thus, elution of the dye does not occur, and the printing is formed and fixed strongly on the surface of the ophthalmic lens.

In the step (1) of the method for producing a colored ophthalmic lens, the dye composition for an ophthalmic lens may be coated on the surface of the ophthalmic lens in a dry state, using an ink-jet coating equipment. Since the dye composition contains in addition to the aforementioned component (A) and the component (B), also the solvent as the component (C) and/or the monomer as the component (D), even when the dye composition is employed onto an ophthalmic lens in such a dry state, a dyed printing can be conveniently obtained by merely using an electromagnetic wave or heat to allow the dye composition to be cured and fixed, without using a large quantity of an alkali solution or fixing solution.

It is preferred that the method for producing a colored ophthalmic lens further includes a heat applying step of applying heat to the ophthalmic lens prior to and/or concomitant with the step (1).

By applying heat to the ophthalmic lens in the stage prior to and/or concomitant with the step (1), the permeation rate of the dye from the initial permeation stage of the dye into the lens substrate is accelerated. In other words, permeation rate in the following step (2) is more accelerated. Additionally, since the solubility of the dye in the dye composition for an ophthalmic lens is secured, the dye can be certainly permeated into the lens substrate, with scarcely generating deposits or residues of the dye on the surface of the lens. Therefore, a safe and highly reliable colored ophthalmic lens can be obtained hardly having a protruding part constructed with deposits or residues of the dye on the surface of the lens. Moreover, since generation of deposits or residues of the dye can be suppressed, a washing step for removing these after dyeing, or a step for eliminating the protruding part for flatting are not necessary. Therefore, colored ophthalmic lens can be provided conveniently at low costs. In addition, when an ophthalmic lens in a dry state is used, a step of previously swelling the ophthalmic lens, and the like become also unnecessary, the production step of the colored ophthalmic lens can be significantly simplified. Furthermore, further acceleration of the diffusion velocity of the dye molecules inside the lens substrate from the initial permeation stage of the dye enables a dyed printing to be obtained which is still sharper without bleeding.

It should be noted that suppression of the generation of the deposits or residues of the dye is believed to be achieved by applying heat to the ophthalmic lens in the step (1) such that the temperature of the dye composition for an ophthalmic lens adhered to the ophthalmic lens per se and on the surface of the lens is elevated to no lower than a certain temperature from the initial permeation stage of the dye. More specifically, when the temperature of the lens substrate per se is no lower than a certain temperature from the initial permeation stage of the dye, diffusion coefficient of the dye in the lens substrate increases to accelerate the permeation rate into the substrate, and thus generation of residues of the dye on the surface of the lens can be effectively suppressed. Furthermore, when the temperature of the dye composition for an ophthalmic lens adhered on the surface of the lens is no lower than a certain temperature from the initial permeation stage, deposition of the dye can be effectively suppressed since solubility of the dye is secured by elevation of saturation solubility of the dye even in the case of increase in the dye concentration in the dye composition for an ophthalmic lens, resulting from even faster permeation of the medium molecules than the dye molecules into the lens substrate. Synergistic effects of these two are believed to accomplish certain permeation of the dye into the lens substrate with scarcely generating deposits or residues of the dye on the surface of the lens.

It is preferred that the method for producing a colored ophthalmic lens further has the heat applying step also subsequent to the step (1). By thus including the application of heat to the ophthalmic lens prior to and/or concomitant with the step (1), as well as subsequent to the step (1) additionally, the temperature of the lens substrate can be no lower than a certain temperature from the initial permeation stage of the dye until the stage of the permeation proceeded. As a result, permeation of the dye into the lens substrate is continuously promoted, and the solubility of the dye in the dye composition for an ophthalmic lens on the lens surface is continuously improved; therefore generation of deposits or residues of the dye is further reduced.

In the method for producing a colored ophthalmic lens, the temperature of the ophthalmic lens subsequent to completing the step (1) is preferably 30° C. or higher and 90° C. or lower. By setting the temperature of the ophthalmic lens subsequent to completing the step (1) to fall within the above range, promotion of permeation of the dye molecules into the lens substrate, and securement of the solubility of the dye in the dye composition for an ophthalmic lens adhered on the surface of the lens can be achieved more effectively without affecting the ophthalmic lens, whereby generation of the deposits or residues of the dye can be further suppressed. In addition, since permeation of the dye molecules inside the ophthalmic lens substrate is particularly effectively executed, a very sharp dyed printing accompanied by less bleeding can be obtained.

In the method for producing a colored ophthalmic lens, the equilibrium swelling measurement achieved by the solvent (C) and/or the monomer (D) of the ophthalmic lens is preferably no less than 40% and no greater than 600%. When the equilibrium swelling measurement of the material constituting the ophthalmic lens achieved by the component (C) in the dye composition for an ophthalmic lens falls within the above range, the permeation rate of the dye molecules to the ophthalmic lens in the dry state is enhanced, and thus generation of deposits or residues of the dye on the surface of the lens can be further suppressed.

A colored ophthalmic lens may be formed by providing the cured matter obtained by curing the dye composition for an ophthalmic lens in at least a part of the surface layer. Such an ophthalmic lens is excellent in elution resistance since it is formed from the dye composition containing each of the components (A), (B), and (C) and/or (D) described above, and thus can sufficiently secure the safety in eyes.

As the ophthalmic lens that serves as a substrate in the colored ophthalmic lens, a contact lens may be used. When the aforementioned dye composition for an ophthalmic lens is used for dyeing a contact lens that has been widely-distributed for daily use, providing a contact lens having a high commercial value and reliability is enabled as the cured matter of this dye composition has superior elution resistance. Such an effect is similarly achieved even in the case in which a hydrous soft contact lens is used as the contact lens.

As the hydrous soft contact lens in the colored ophthalmic lens, one formed from a copolymer of a monomer containing a silicone compound is preferably used. When the hydrous soft contact lens is thus formed from a copolymer of a monomer containing a silicone compound, high flexibility and oxygen permeability can be imparted to the contact lens.

As the ophthalmic lens that serves as a substrate in the colored ophthalmic lens, an oxygen permeable hard contact lens may be used. Also in the case in which an oxygen permeable hard contact lens is used as an ophthalmic lens, a contact lens having high commercial value and reliability can be provided similarly to the case described above as the cured matter of the dye composition has superior elution resistance.

Effects of the Invention

As explained in the foregoing, according to the dye composition for an ophthalmic lens of the present invention, a dyed printing, which is extremely superior in elution resistance and is semipermanently stable, being hardly accompanied by elution, can be formed on ophthalmic lenses. This dyed printing has extremely high durability, as elution of the dye can be avoided even when swollen with water, boiled, or washed. Such effects are similarly achieved also in an ophthalmic lens not having a group that can react with a reactive dye. In addition, the dye composition for an ophthalmic lens may be employed for printing on an ophthalmic lens using an ink-jet coating equipment since convenient dyeing is enabled by merely allowing the dye composition to be cured and fixed by means of an electromagnetic wave or heat, without using a large quantity of an alkali solution or fixing solution. Moreover, according to the method for producing a colored ophthalmic lens including a heat applying step, the dye can be permeated easily and certainly into the lens substrate on an ophthalmic lens in the dry state, with scarcely generating deposits or residues of the dye on the surface of the lens.

MODE FOR CARRYING OUT THE INVENTION

Figure 1:
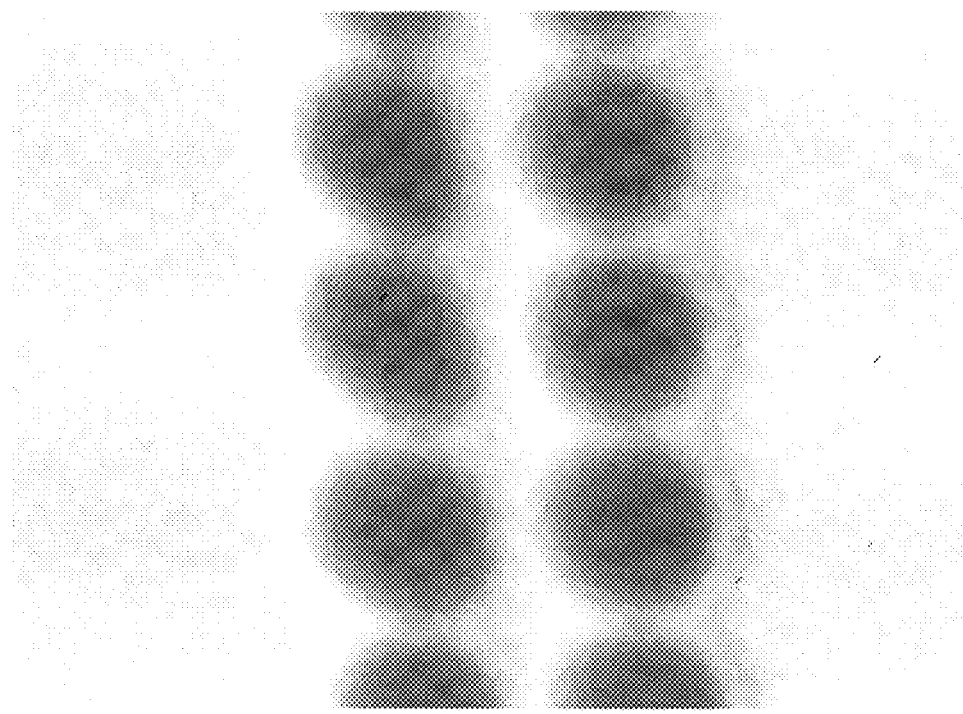
FIG. 1 shows a stereomicroscopic image of a dyed printing formed in Example 53.

Hereinafter, preferred modes for carrying out the present invention are explained in detail.

The dye composition for an ophthalmic lens used for dyeing an ophthalmic lens by an ink-jet coating equipment according to the present invention contains: (A) a dye having at least one group having a carbon-carbon double bond selected from the group consisting of an $\alpha,\beta$-unsaturated carbonyl group, a styryl group, a vinylbenzyl group and an allyl group per molecule; (B) a radical polymerization initiator; and (C) a solvent capable of dissolving at least a part of the component (A) and the component (B), and/or (D) a monomer. Hereinafter, each component of the dye composition for an ophthalmic lens is sequentially explained.

Component (A): Dye Having at Least One Group Having a Specific Carbon-Carbon Double Bond Per Molecule The dye as the component (A) has a chemical structure that forms a specific color by absorbing or reflecting a part of visible light, and is defined as a compound having at least one group having a specific carbon-carbon double bond per molecule. This group having a carbon-carbon double bond is selected from the group consisting of an $\alpha,\beta$-unsaturated carbonyl group, a styryl group, a vinylbenzyl group and an allyl group. By using such a dye, a dye composition capable of forming a dyed printing that is extremely superior in elution resistance on an ophthalmic lens is obtained. The reason for extremely enhancing the elution resistance of the dyed printing formed is believed to: polymerization of the dye molecules in polymer network constructing the substrate of the ophthalmic lens; immobilization of the dye molecules by a graft reaction with the polymer in the substrate of the ophthalmic lens; or the like.

The $\alpha,\beta$-unsaturated carbonyl group is preferably a (meth)acrylate group or a (meth)acrylamide group. When the group having a carbon-carbon double bond in the component (A) is such a specific group, elution resistance for the ophthalmic lens of the dye composition can be enhanced, and printing characteristics to the ophthalmic lens can be further improved. It is to be noted that the styryl group may be either a styryl group not having a substituent, or a styryl group having a substituent such as an α-methyl group. The vinylbenzyl group may be any one of o-, m- and p-vinylbenzyl groups.

From the point of view of the chemical structure of the dye that forms a specific color by absorbing or reflecting a part of visible light, the dyes can be classified into azo-based dyes, anthraquinone-based dyes, nitro-based dyes, phthalocyanine-based dyes, quinoneimine-based dyes, quinoline-based dyes, carbonyl-based dyes, triarylmethane-based dyes, methine-based dyes, and the like.

The dye having at least one (meth)acrylate group per molecule is not particularly limited, and for example, 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1-(α-anthrylazo)-2-hydroxy-3-(meth)acryloyloxynaphthalene, 1-((4'-phenylazo)phenyl)azo-2-hydroxy-3-(meth)acryloyloxynaphthalene, 1-(2',4'-xylylazo)-2-(meth)acryloyloxynaphthalene, 1-(o-tolylazo)-2-(meth)acryloyloxynaphthalene, 2,4-dihydroxy-3-(p-(meth)acryloyloxymethylphenylazo)benzophenone, 2,4-dihydroxy-5-(p-(meth)acryloyloxymethylphenylazo)benzophenone, 2,4-dihydroxy-3-(p-(meth)acryloyloxyethylphenylazo)benzophenone, 2,4-dihydroxy-5-(p-(meth)acryloyloxyethylphenylazo)benzophenone, 2,4-dihydroxy-3-(p-(meth)acryloyloxypropylphenylazo)benzophenone, 2,4-dihydroxy-5-(p-(meth)acryloyloxypropylphenylazo)benzophenone, 2,4-dihydroxy-3-(o-(meth)acryloyloxymethylphenylazo)benzophenone, 2,4-dihydroxy-5-(o-(meth)acryloyloxymethylphenylazo)benzophenone, 2,4-dihydroxy-3-(o-(meth)acryloyloxyethylphenylazo)benzophenone, 2,4-dihydroxy-5-(o-(meth)acryloyloxyethylphenylazo)benzophenone, 2,4-dihydroxy-3-(o-(meth)acryloyloxypropylphenylazo)benzophenone, 2,4-dihydroxy-5-(o-(meth)acryloyloxypropylphenylazo)benzophenone, 2,4-dihydroxy-3-(p-(N,N-di(meth)acryloyloxyethylamino)phenylazo)benzophenone, 2,4-dihydroxy-5-(p-N,N-di(meth)acryloyloxyethylamino)phenylazo)benzophenone, 2,4-dihydroxy-3-(o-N,N-di(meth)acryloyloxyethylamino)phenylazo)benzophenone, 2,4-dihydroxy-5-(o-(N,N-di(meth)acryloyloxyethylamino)phenylazo)benzophenone, 2,4-dihydroxy-3-(p-(N-ethyl-N-(meth)acryloyloxyethylamino)phenylazo)benzophenone, 2,4-dihydroxy-5-(p-(N-ethyl-N-(meth)acryloyloxyethylamino)phenylazo)benzophenone, 2,4-dihydroxy-3-(o-(N-ethyl-N-(meth)acryloyloxyethylamino)phenylazo)benzophenone, 2,4-dihydroxy-5-(o-(N-ethyl-N-(meth)acryloyloxyethylamino)phenylazo)benzophenone, and the like may be exemplified.

Other examples of the dye having at least one (meth)acrylate group per molecule include 1-((4-(phenylazo)phenyl)azo)-3-methacryloyloxy-2-naphthol represented by the following formula (1), 1-phenylazo-3-methacryloyloxy-2-naphthol represented by the following formula (2), 1-phenylazo-4-methacryloyloxy-naphthalene represented by the following formula (3), and 2,4-dihydroxy-5-(4-(2-(N-(2-methacryloyloxy)ethyl)carbamoyloxyethyl)phenylazo)benzophenone represented by the following formula (4).

[chemical formula 1]

(1)

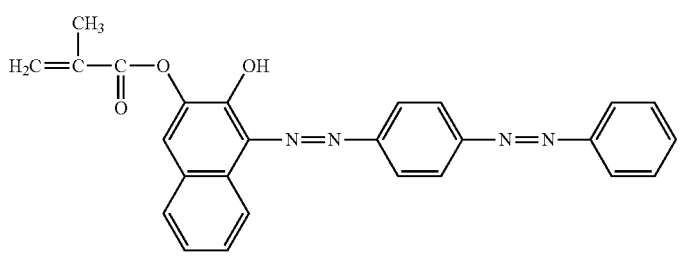

[chemical formula 2]

(2)

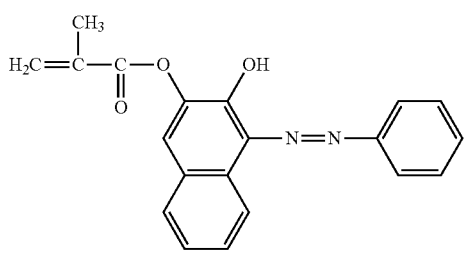

[chemical formula 3]

(3)

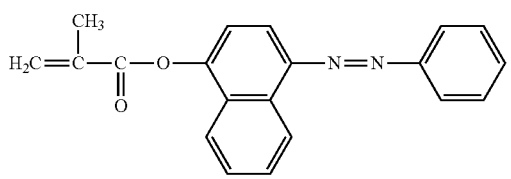

[chemical formula 4]

(4)

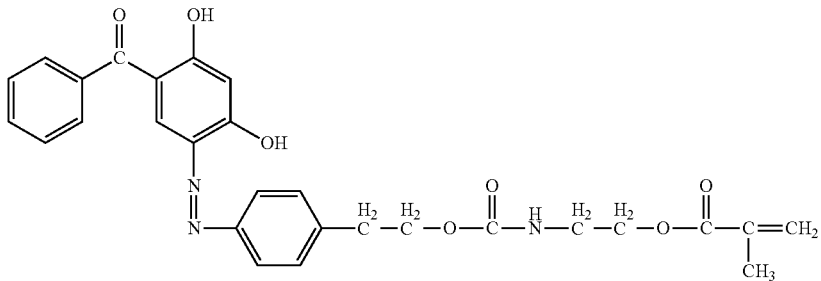

The dye having at least one (meth)acrylamide group per molecule, is not particularly limited, and for example, tetra-(4-methacrylamide)copper phthalocyanine represented by the following formula (5), tetra-(methacrylamide)dodecanoyl copper phthalocyanine, and the like may be exemplified.

[chemical formula 5]

(5)

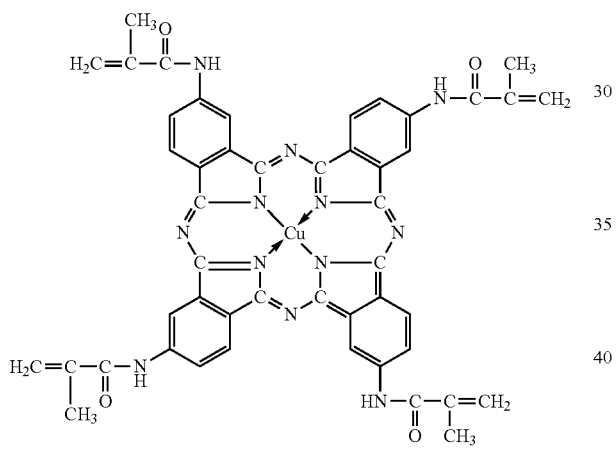

The dye having at least one styryl group per molecule is not particularly limited, and for example, 1-(ethenylphenyl)amino-anthraquinone, 1,4-bis((ethenylphenyl)amino)-anthraquinone represented by the following formula (6), 1,8-bis((ethenylphenyl)amino)-anthraquinone represented by the following formula (7), 1-(ethenylphenyl)amino-4-hydroxyanthraquinone, 1-(ethenylphenyl)amino-4-(4-methylphenyl)amino-anthraquinone, and the like may be exemplified.

[chemical formula 6]

(6)

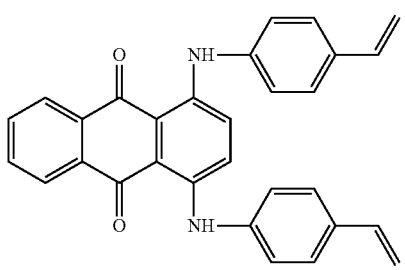

[chemical formula 7]

(7)

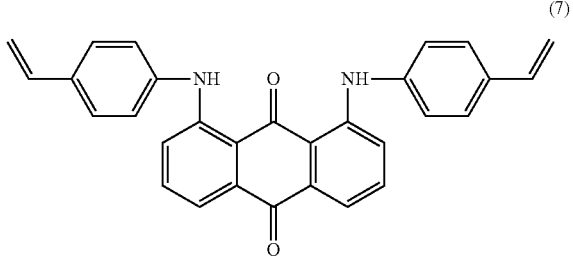

The dye having at least one vinylbenzyl group per molecule is not particularly limited, and for example, 1,4-bis((vinylbenzyl)amino)-anthraquinone may be exemplified.

The dye having at least one allyl group per molecule is not particularly limited, and for example, 1-(4-allyloxymethylphenyl)amino-4-hydroxyanthraquinone represented by the following formula (8), 1-(4-allyloxyethylphenyl)amino-4-hydroxyanthraquinone represented by the following formula (9), 1,4-bis(4-allyloxyethylphenyl)aminoanthraquinone represented by the following formula (10), and the like may be exemplified.

[chemical formula 8]

(8)

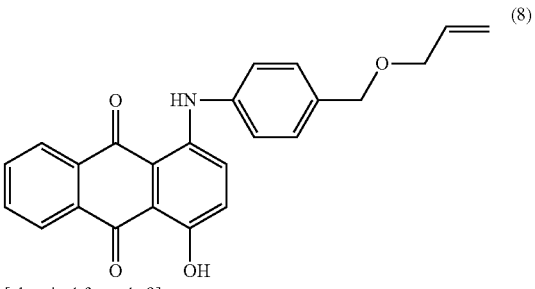

[chemical formula 9]

(9)

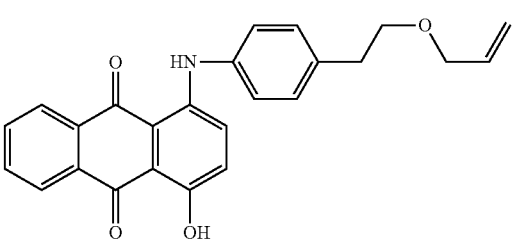

[chemical formula 10]

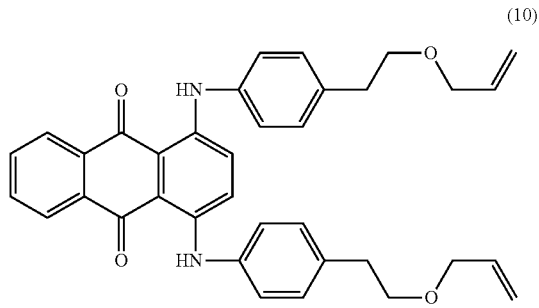

(10)

The proportion of the dye as the component (A) used in the dye composition is not particularly limited, but is preferably 0.1 parts by mass or greater and 10 parts by mass or less, and more preferably 0.5 parts by mass or greater and 5 parts by mass or less relative to 100 parts by mass in total of the solvent as the component (C) and/or the monomer (D) described later. By thus adjusting the proportion of the component (A) to no less than 0.1 parts by mass, sufficient visibility of the dyed printing can be provided. In addition, by adjusting the proportion of the component (A) to no greater than 10 parts by mass, generation of a portion failed in dissolution in the composition can be reduced, and uneven permeation into the ophthalmic lens due to excess dye, and occurrence of uneven dyeing induced therefrom (deterioration of appearance when the lens is worn) can be prevented. In the dye composition, the dye as the component (A) may be used either alone, or as a mixture of a plurality of types of the dyes. Moreover, the dye composition may include, in addition to the component (A), a nonreactive dye (for example, "D&C Green No. 6" and "D&C Red No. 17") in an amount within the range not to inhibit the aforementioned effects.

Component (B): Radical Polymerization Initiator

The radical polymerization initiator as the component (B) is a compound that generates a radical (free group) by application of an active energy ray (ray of light such as ultraviolet light or visible light (an electromagnetic wave)) or heat, and is defined as a compound capable of initiating radical polymerization of the dye having at least one group having a specific carbon-carbon double bond per molecule per se as the component (A), or radical polymerization of the dye as the component (A) with the monomer (D) described later. The radical polymerization initiator as the component (B) not particularly limited as long as it has thus defined properties.

Specific examples of the radical polymerization initiator reactive to an active energy ray include:

phosphineoxide-based photopolymerization initiators such as 2,4,6-trimethylbenzoyl-diphenyl phosphineoxide (TMDPO), and bis(2,4,6-trimethylbenzoyl)-phenylphosphineoxide; benzoin-based photopolymerization initiators such as methylorthobenzoyl benzoate, methylbenzoyl formate, benzoinmethyl ether, benzoinethyl ether, benzoinisopropyl ether, and benzoin-n-butyl ether; phenone-based photopolymerization initiators such as 2-hydroxy-2-methyl-1-phenyl-propane-1-one, p-isopropyl-α-hydroxyisobutylphenone, p-t-butyltrichloroacetophenone, α,α-dichloro-4-phenoxyacetophenone, N,N-tetraethyl-4,4'-diaminobenzophenone, and 4,4'-bisdimethylaminobenzophenone; ketone-based photopolymerization initiators such as 1-hydroxycyclohexylphenylketone, 1-phenyl-1,2-propane dione-2-(o-ethoxycarbonyl)oxime, and 1-(4-isopropylphenyl)-2-hydroxy-2-methylpropane-1-one; thioxanthone-based photopolymerization initiators such as 2-chlorothioxanthone, 2-methylthioxanthone, and isopropylthioxanthone; ketal-based photopolymerization initiators such as benzylmethylketal, benzyldimethylketal, and acetophenonediethylketal; other polymerization initiators such as dibenzosparon, benzophenone, benzyl, and the like.

Specific examples of the radical polymerization initiator reactive to heat include:

2,2'-azobisisobutyronitrile, 2,2'-azobis(2,4-dimethylvaleronitrile), benzoylperoxide, t-butylhydroperoxide, cumenehydroperoxide, lauroylperoxide, t-butylperoxyhexanoate, 3,5,5-trimethylhexanoylperoxide, and the like.

The proportion of the radical polymerization initiator as the component (B) used in the dye composition is not particularly limited but is preferably 0.1 parts by mass or greater and 20 parts by mass or less, and more preferably 0.5 parts by mass or greater and 15 parts by mass or less relative to 100 parts by mass in total of the solvent as the component (C) and/or the monomer as the component (D) described later. By adjusting the proportion of the component (B) to no less than 0.1 parts by mass, the radical polymerization reactivity can be maintained at a high level, whereby elution of the dye not fixed on the ophthalmic lens, and color fading can be suppressed. By adjusting the proportion of the component (B) to no greater than 20 parts by mass, the residual amount of the radical polymerization initiator in the ophthalmic lens substrate is decreased, whereby the safety can be improved, and uneven permeation of the radical polymerization initiator to the ophthalmic lens, and uneven dyeing induced therefrom can be prevented. The radical polymerization initiator may be used alone, or a plurality of types of the compounds may be used in combination.

Component (C): Solvent

The solvent as the component (C) is not particularly limited as long as it is a liquid capable of dissolving at least a part of the component (A) and the component (B). The solvent as the component (C) is preferably a liquid capable of dissolving at least a part of the monomer (D) which is an optional component, in addition to the component (A) and the component (B). Furthermore, the solvent as the component (C) is more preferably a liquid capable of dissolving the substantial entirety of the component (A) and the component (B), or the substantial entirety of the component (A), the component (B) and the component (D) as an optional component.

Typical examples of the solvent as the component (C) used in the dye composition include:

water; alcohols such as methanol, ethanol, propanol, glycerol, trifluoroethyl alcohol, and hexafluoroisopropyl alcohol;

ketones such as methyl ethyl ketone, and acetone;

aromatic hydrocarbon-based solvents such as toluene, benzene, and xylene;

linear aliphatic hydrocarbon-based solvents such as hexane, and octane;

cyclic aliphatic hydrocarbon-based solvents such as cyclohexane, and decalin;

ester-based solvents such as ethyl acetate, and methyl acetate;

ether-based solvents such as diethyl ether, and tetrahydrofuran;

halocarbon-based solvents such as chloroform, methylene chloride, carbon tetrachloride, and Freon;

amide-based solvents such as dimethyl formamide, N-methyl-2-pyrrolidone, 2-pyrrolidone, and N,N-dimethylacetamide;

other solvents such as dimethyl sulfoxide, and water containing an electrolyte salt such as sodium chloride; and the like.

The solvent as the component (C) may be used alone, or a plurality of types of the solvents may be used in combination.

Component (D): Monomer Having One Radical Polymerizable Group Per Molecule

The "radical polymerizable group" as referred to herein means an unsaturated group which is radical polymerizable. In the case in which a liquid monomer is used as the monomer (D), when the dye as the component (A) and the radical polymerization initiator as the component (B) are soluble in this liquid monomer, a dye solution can be prepared using such a monomer without using the solvent as the component (C). Also, in such a dye composition, the solvent as the component (C) and the monomer (D) may be used in combination. By using the monomer (D) in the dye composition, polymerization and fixation to give a polymer network in the ophthalmic lens substrate by the dye molecules as the component (A), or immobilization by a graft reaction with the polymer of the ophthalmic lens substrate may be further strengthened, and peeling resistance and elution resistance of the dyed printing against washing, etc., are believed to be even more enhanced. Furthermore, by using such a monomer (D), providing a dyed printing which is permanently stable and is accompanied by seldom elution is enabled even on an ophthalmic lens substrate not having a functional group that can react with a reactive dye.

Examples of the monomer (D) include:

unsaturated group-containing carboxylic acids such as methacrylic acid, and acrylic acid;

alkyl(meth)acrylates such as methyl(meth)acrylate, ethyl(meth)acrylate, n-propyl(meth)acrylate, isopropyl(meth)acrylate, n-butyl(meth)acrylate, t-butyl(meth)acrylate, isobutyl(meth)acrylate, n-pentyl(meth)acrylate, t-pentyl(meth)acrylate, hexyl(meth)acrylate, heptyl(meth)acrylate, octyl(meth)acrylate, 2-ethylhexyl(meth)acrylate, nonyl(meth)acrylate, decyl(meth)acrylate, dodecyl(meth)acrylate, stearyl(meth)acrylate, cyclopentyl(meth)acrylate, and cyclohexyl(meth)acrylate;

alkoxy group-containing (meth)acrylates such as methoxyethyl(meth)acrylate, ethoxyethyl(meth)acrylate, and methoxydiethylene glycol(meth)acrylate;

hydroxy group-containing (meth)acrylates such as hydroxyethyl(meth)acrylate, hydroxypropyl(meth)acrylate, hydroxybutyl(meth)acrylate, dihydroxypropyl(meth)acrylate, dihydroxybutyl(meth)acrylate, diethylene glycol mono(meth)acrylate, triethylene glycol mono(meth)acrylate, dipropyleneglycol mono(meth)acrylate, and glycerol(meth)acrylate;

styrene derivatives such as styrene, pentafluorostyrene, o-, m-, p-methylstyrene, α-methylstyrene, trimethylstyrene, trifluoromethylstyrene, (pentamethyl-3,3-bis(trimethylsiloxy)trisiloxanyl)styrene, (hexamethyl-3-trimethylsiloxytrisiloxanyl)styrene, and dimethylaminostyrene;

carbon-carbon unsaturated group-containing lactams such as N-vinyl-2-pyrrolidone, 1-methyl-3-methylene-2-pyrrolidinone, N-vinylcaprolactam, and N-(meth)acryloylpyrrolidone;

(meth)acrylamides such as (meth)acrylamide, N-methyl(meth)acrylamide, N-ethyl(meth)acrylamide, N-hydroxyethyl(meth)acrylamide, N,N-dimethyl(meth)acrylamide, N,N-diethyl(meth)acrylamide, and N-ethyl-N-aminoethyl(meth)acrylamide;

polyfunctional monomers having at least two unsaturated groups such as ethylene glycol di(meth)acrylate, diethylene glycol di(meth)acrylate, 4-vinylbenzyl(meth)acrylate, triethylene glycol di(meth)acrylate, propyleneglycol di(meth)acrylate, dipropyleneglycol di(meth)acrylate, allyl(meth)acrylate, vinyl (meth)acrylate, trimethylolpropane tri(meth)acrylate, methacryloyloxyethyl acrylate, divinylbenzene, diallyl phthalate, diallyl adipate, triallyl isocyanurate, and α-methylene-N-vinylpyrrolidone;

silicon-containing (meth)acrylates such as pentamethyldisiloxanylmethyl(meth)acrylate, pentamethyldisiloxanylpropyl(meth)acrylate, methylbis(trimethylsiloxy)silylpropyl(meth)acrylate, tris(trimethylsiloxy)silylpropyl(meth)acrylate, mono(methylbis(trimethylsiloxy)siloxy)bis(trimethylsiloxy)silylpropyl(meth)acrylate, tris(methylbis(trimethylsiloxy)siloxy)silylpropyl(meth)acrylate, methylbis(trimethylsiloxy)silylpropylglyceryl(meth)acrylate, tris(trimethylsiloxy)silylpropylglyceryl(meth)acrylate, mono(methylbis(trimethylsiloxy)siloxy)bis(trimethylsiloxy)silylpropylglyceryl(meth)acrylate, trimethylsilylethyltetramethyldisiloxanylpropylglyceryl(meth)acrylate, trimethylsilylmethyl(meth)acrylate, trimethylsilylpropyl(meth)acrylate, trimethylsilylpropylglyceryl(meth)acrylate, pentamethyldisiloxanylpropylglyceryl(meth)acrylate, methylbis(trimethylsiloxy)silylethyltetramethyldisiloxanylmethyl(meth)acrylate, tetramethyltriisopropylcyclotetrasiloxanylpropyl(meth)acrylate, and tetramethyltriisopropylcyclotetrasiloxybis(trimethylsiloxy)silylpropyl(meth)acrylate;

fluorine-containing (meth)acrylates such as trifluoroethyl(meth)acrylate, tetrafluoropropyl(meth)acrylate, pentafluoropropyl(meth)acrylate, hexafluoroisopropyl(meth)acrylate, tetrafluoro-t-pentyl(meth)acrylate, hexafluorobutyl(meth)acrylate, hexafluoro-t-hexyl(meth)acrylate, octafluoropentyl(meth)acrylate, 2,3,4,5,5,5-hexafluoro-2,4-bis(trifluoromethyl)pentyl(meth)acrylate, dodecafluoroheptyl(meth)acrylate, 2-hydroxyoctafluoro-6-trifluoromethylheptyl(meth)acrylate, 2-hydroxidedecafluoro-8-trifluoromethylnonyl(meth)acrylate, and 2-hydroxyhexadecafluoro-10-trifluoromethylundecyl(meth)acrylate;

aminoalkyl(meth)acrylates such as aminoethyl(meth)acrylate, N-methylaminoethyl(meth)acrylate, and N,N-dimethylaminoethyl(meth)acrylate;

aromatic ring-containing (meth)acrylates such as benzyl(meth)acrylate;

alkyl esters of itaconic acid, crotonic acid, maleic acid, fumaric acid and the like, which may be substituted with an alkyl group, a fluorine-containing alkyl group, or a siloxanylalkyl group;

heterocyclic N-vinyl monomers such as vinylimidazole, N-vinylpiperidone, N-vinylpiperidine, and N-vinylsuccinimide, and the like.

Among these monomers, hydroxyethyl(meth)acrylate, hydroxybutyl(meth)acrylate, ethylene glycol di(meth)acrylate, 4-vinylbenzyl(meth)acrylate, dodecyl(meth)acrylate, 1-methyl-3-methylene-2-pyrrolidinone, methyl(meth)acrylate, tris(trimethylsiloxy)silylpropyl(meth)acrylate, glycerol(meth)acrylate, methoxyethyl(meth)acrylate, styrene, N,N-dimethyl(meth)acrylamide, ethyl(meth)acrylate, butyl(meth)acrylate, and N-vinylpyrrolidone are preferred in light of the radical polymerization reactivity and availability.

The monomer (D) may be used alone, or a plurality of the monomers may be used in combination.

With respect to the component (C) and the component (D) in the dye composition, only either one of them may be used as described above, and the proportion of each and the ratio of both are not particularly limited. For example, the proportion of the component (C) used in the dye composition may be 0.1% by mass or greater and 99.8% by mass or less, whereas the proportion of the component (D) when used may be 1% by mass or greater and 99.8% by mass or less.

As the solvent (C) and/or the monomer (D), those which can lead to swelling of the polymer network that constructs the ophthalmic lens substrate may be suitably used. Such a solvent (C) and/or monomer (D) cannot be categorically defined, since swelling behaviors of the polymer network that may result from the solvent (C) and/or the monomer (D) depend on type of the ophthalmic lens substrate polymer, and the shape of the aggregate structure of the polymer. However, for example: the solvent (C) and/or the monomer (D) capable of lysing linear polymer chains constructing the cross-linked structure of the substrate polymer; the solvent (C) and/or the monomer (D) having chemical structures similar to the repeating unit of the substrate polymer; the solvent (C) and/or the monomer (D) which can solvate with the substrate polymer; the solvent (C) and/or the monomer (D) having a polar group; the solvent (C) and/or the monomer (D) having a cyclic structure, and the like may be exemplified. When the polymer constructing the ophthalmic lens substrate is formed from a copolymer of a silicone compound as a constitutive monomer unit, the solvent (C) and/or the monomer (D) which do not have a chemical structure similar to that of the polymer can be also used suitably since such a polymer often has an amorphous structure, in general.

Specific examples of the solvent (C) and/or the monomer (D) capable of allowing the lens substrate polymer to be swollen include, when the ophthalmic lens substrate is polymethyl methacrylate, for example, ketones such as methyl ethyl ketone; esters such as ethyl acetate; cyclic amides such as N-methyl-2-pyrrolidone; cyclic ethers such as tetrahydrofuran; and the like, which have chemical structures similar to the repeating unit of the substrate polymer.

In order to represent such a swelling behavior, equilibrium swelling measurements may be employed. The lower limit of the equilibrium swelling measurement resulting from the solvent (C) and/or the monomer (D) is preferably 40%, more preferably 70%, and still more preferably 100% of the ophthalmic lens. On the other hand, the upper limit of the equilibrium swelling measurement of the ophthalmic lens resulting from the solvent (C) and/or the monomer (D) is preferably 600%, more preferably 500%, and still more preferably 400%. When the equilibrium swelling measurement of the ophthalmic lens resulting from the solvent (C) and/or the monomer (D) is smaller than the lower limit described above, the permeation rate of the dye solution into the ophthalmic lens is lowered, whereby the dyeing may require a long period of time. To the contrary, when the equilibrium swelling measurement exceeds the upper limit described above, permeation of the solvent (C) and/or the monomer (D) proceeds too quickly, and thus bleeding and the like are likely to occur, whereby obtaining a sharp and favorable dyed printing may fail. Herein, the equilibrium swelling measurement of the ophthalmic lens resulting from the solvent (C) and/or the monomer (D) is a value calculated by the following formula (1):

$$\text{equilibrium swelling measurement}(\%) = (W2 - W1) \times 100/W1 \quad (1),$$

from values of the mass (W1) of dry ophthalmic lens and the mass (W2) of the ophthalmic lens in the swollen state, derived by immersing an ophthalmic lens in the dry state with the solvent (C) and/or the monomer (D) at 25° C. for 24 hrs to permit swelling.

It is preferred that the solvent (C) and/or the monomer (D) are not easily volatilized even if attached to the surface of the ophthalmic lens having an elevated temperature in the heat applying step described below. Although such a medium cannot be categorically defined since it depends on the preset temperature value in the heat applying step, in general, the boiling point in the normal conditions is preferably no lower than 50° C., more preferably no lower than 60° C., and still more preferably no lower than 70° C.

Component (E): Surfactant

The surfactant as the component (E) can be used for allowing a solution of the dye composition to be smoothly permeated into the ophthalmic lens substrate, and for preventing bleeding of the dyed printing formed from the dye composition. In addition, the surfactant has an effect of stabilizing micelles in the dye composition described later. Such a surfactant is used in the state being dissolved or emulsified in the dye composition solution.

Specific examples of the surfactant include:

nonionic surfactants such as polyoxyethylene alkylphenyl ether, polyoxyethylene alkyl ether, polyoxyethylene-polyoxypropylene block copolymers and derivatives thereof, sorbitan fatty acid esters, polyoxyethylene sorbitan fatty acid esters such as monooleic acid polyoxyethylene sorbitan, polyoxyethylene hydrogenated castor oil (for example, polyoxyethylene hydrogenated castor oil), and polyoxyethylene alkyl ether carboxylic acids and salts thereof;

anionic surfactants such as fatty acid salts, alkylsulfuric acid salts, polyoxyethylene alkyl ether sulfuric acid salts, polyoxyethylene alkylsulfuric acid salts, polyoxyethylene alkylacetic acid salts, and alkylbenzenesulfonic acid salts;

cationic surfactants such as alkyltrimethyl ammonium salts, dialkyldimethyl ammonium salts, and alkylbenzyldimethyl ammonium salts;

amphoteric surfactants such as alkylaminofatty acid sodium, alkylbetaine, and alkylcarboxybetaine, and the like.

Among these surfactants, polyoxyethylene hydrogenated castor oil is most preferred in light of permeation properties of the dye composition solution into the ophthalmic lens substrate.

The proportion of the component (E) used in the dye composition is not particularly limited but is preferably 0.001% by mass or greater and 5% by mass or less. By adjusting the proportion of the component (E) to no less than 0.001% by mass, permeation properties of the dye composition can be effectively improved, and generation of the bleeding of the dyed printing can be suppressed. The proportion of the component (E) is more preferably no less than 0.01% by mass. On the other hand, by adjusting the proportion of the component (E) to no greater than 5% by mass, wastefulness due to use of the surfactant in excess can be prevented. The proportion of the component (E) is more preferably no greater than 2% by mass. The surfactant as the component (E) may be used alone, or a plurality of types of the surfactants may be used in combination.

[Dye Composition for Ophthalmic Lens]

The dye composition for an ophthalmic lens of the present invention is prepared by mixing a dye having at least one group having a specific carbon-carbon double bond per molecule as a component (A) described above, a radical polymerization initiator as a component (B), and a solvent as a component (C), and/or a monomer (D), and as needed other optional component such as a surfactant etc., as the a component (E) in appropriate amounts. The order of mixing these components is not particularly limited.

The form of the dye composition is desirably a homogenous solution. When the dye composition is in the form of such a homogenous solution, clogging in the discharge nozzle can be effectively prevented in printing on an ophthalmic lens using an ink-jet coating equipment to enable a favorable dyed printing to be obtained. Additionally, the dye composition in the form of a homogenous solution can be permeated easily and evenly into the ophthalmic lens. The "homogenous solution" as referred to herein includes not only those in the state in which the dye is dispersed as molecules or dissolved in the dye composition, and those in the state in which at least a part of the dye forms aggregates such as micelles. However, the aggregates such as micelles herein preferably have a size in the range that can pass through the polymer network structure formed in the substrate of the ophthalmic lens such that they can permeate into the ophthalmic lens. The size of aggregates such as micelles depends on type and size of the polymer network structure that forms the ophthalmic lens material cannot be categorically defined, but an average upper limit of 500 to 600 nm is preferred.

[Ophthalmic Lens]

The ophthalmic lens dyed with the dye composition is a lens that enables correction of eyesight and improvement of esthetic preference by applying to human eyes, and includes not only contact lenses, but also intraocular lenses, artificial cornea, corneal onlay, corneal inlay, and the like according to the concept of the present invention. Such ophthalmic lenses are constructed with a polymer material having a cross-linked structure, in general, and has a polymer network structure inside the lens. When the dye composition is used for dyeing a contact lens that has been widely-distributed for daily use, providing a contact lens having a high commercial value and reliability is enabled as the cured matter of this dye composition has superior elution resistance. As the contact lens, hydrous soft contact lenses that are softened by including water, nonhydrous soft contact lenses, hard oxygen permeable contact lenses, and hybrid contact lenses constructed with any combination of these are exemplified. The dye composition is extremely excellent in elution resistance as described above, and can form a dyed printing that is semi-permanently stable with seldom elution; therefore, it is suitably used in soft contact lenses, also hydrous soft contact lenses in particular, thereby capable of forming a dyed printing that is superior in durability. As the material entity of such ophthalmic lenses, any one which is well-known may be used. For example, as the material entity of hydrous soft contact lenses, a hydro gel prepared by allowing a polymer compound such as polyhydroxyethyl methacrylate to be swollen in a water-based solvent may be used.

When a hydrous soft contact lens is used as the ophthalmic lens as described above, one formed from a copolymer of a monomer containing a silicone compound is preferably used. The hydrous soft contact lens thus formed from a copolymer of a monomer containing a silicone compound can impart high flexibility and oxygen permeability to the contact lens. Although such a copolymer is not particularly limited, for example, a silicone hydro gel prepared by copolymerization of a silicone monomer (or macromer) and a hydrous monomer may be used. Examples of the silicone monomer etc., which may be used include compounds having an ethylenic unsaturated group and polydimethylsiloxane structure via a urethane bond, silicone compounds having a hydrophilic structure moiety in the molecule, silicone-containing alkyl (meth)acrylate, silicone-containing styrene derivatives and silicone-containing fumaric acid diesters, and the like.

As the ophthalmic lens which is a subject to be dyed with the dye composition, an ophthalmic lens not having a group that can react with a reactive dye may be suitably used. Even in the case in which the ophthalmic lens does not have a group that can react with a reactive dye conventionally used, a dyed printing having superior elution resistance is believed to be obtainable by formation of a polymer network structure in the ophthalmic lens by the dye molecules as described above.

[Method for Producing Colored Ophthalmic Lens]

Next, a method for producing a colored ophthalmic lens with the aforementioned dye composition for an ophthalmic lens using an ink-jet coating equipment is explained. The method for production includes:

(1) a step of coating the dye composition for an ophthalmic lens of the present invention on the surface of an ophthalmic lens using an ink-jet coating equipment;

(2) a step of allowing at least a part of the coated dye composition for an ophthalmic lens to be permeated into the ophthalmic lens; and (3) a step of polymerizing the dye composition for an ophthalmic lens by applying an active energy ray and/or heat to the dye composition for an ophthalmic lens.

[Coating Step (1)]

In the aforementioned step (1), a solution or dispersion liquid of the dye composition of the present invention is applied on the surface of an ophthalmic lens using an ink-jet coating equipment. For coating the dye composition, a well-known ink-jet coating equipment may be used. Typical ink-jet coating equipment is composed of a system for feeding the dye composition for an ophthalmic lens, and a discharge apparatus constructed with a nozzle provided with piezo electric elements such as piezo elements, providing a mechanism in which vibration generated by applying a voltage to the piezo electric element results in discharge of the dye composition for an ophthalmic lens as fine droplets from the nozzle. Any ink-jet coating equipment may be suitably used as long as desired droplets can be discharged. The nozzle may be present either singly or plurally. A discharge apparatus disposed with a plurality of nozzles can concurrently discharge solutions or dispersion liquids containing different dyes, respectively, and thus high-quality multicolor printing can be executed at high speed. Such an ink-jet coating equipment provided with a plurality of nozzles can be also used suitably. When such multicolor printing is carried out, at least two dye compositions (solutions or dispersion liquids) each containing a dye of each different color tone are filled in retainer tanks, respectively, and then a printing can be obtained by discharging various dye compositions at desired positions with a programmed scanning system by a computer or the like.

The dye composition may be coated on the surface of an ophthalmic lens in the dry state. Since the dye composition includes in addition to the component (A) and the component (B), a solvent as the component (C) and/or a monomer as the component (D), at least a part of this composition is sufficiently permeated into the ophthalmic lens even in the case in which the dye composition is coated to an ophthalmic lens in the dry state. Thus, it is believed that a dyed printing having high solvent resistance and durability can be conveniently obtained.

The ophthalmic lens dyed with the dye composition is preferably in the dry state. In the case of ophthalmic lenses in the swollen state having inferior mechanical strength and being likely to be broken, as according to a swelling method conventionally used frequently, it is necessary to use a specific handling apparatus or jig etc. To the contrary, according to the method for producing a colored ophthalmic lens, the steps can be simplified and improvement of the productivity can be achieved since the ophthalmic lens in the dry state can be directly dyed. Herein, the "ophthalmic lens in the dry state" refers to an ophthalmic lens not in the soft state as a result of swelling, but includes those in the state of not or only slightly containing medium and can be swollen, which may be generally referred to as "xero gel", etc.

A time period required for the step (1) may vary depending on the method for bringing the dye composition for an ophthalmic lens to be in contact, as well as the area and shape of a dyed printing to be formed, size of the ophthalmic lens and the like. However, when, for example, an ink-jet coating equipment is used, the time period is usually from several seconds to about 10 minutes.

[Permeation Step (2)]

In the aforementioned step (2), the dye composition (solution or dispersion liquid) discharged from the ink-jet coating equipment is attached to the surface of the ophthalmic lens, ant this dye composition may be left to stand until completely permeated from the surface to inside the ophthalmic lens. Alternatively, after the dye composition attached to the surface of the ophthalmic lens, it may be left to stand until the state is formed in which a part of the dye composition is permeated into the ophthalmic lens, while the rest forms an interface with the ambient air. When either of these states is formed, application of an electromagnetic wave or heat in the following step (3) described below may be carried out. Time period required for each of the above two cases for permeation of the dye composition is not particularly limited, which depends upon a large number of factors such as components and their proportions of the dye composition, required degree of permeation of the dye composition, the ambient temperature in coating, etc. Therefore, the time period for permeation of the dye composition may be determined by visual inspection of the process of permeation of the dye composition into the ophthalmic lens using a microscope. Although the time period required for complete permeation of the dye composition from the surface to inside the ophthalmic lens is not particularly limited, it is, for example, 60 sec or longer and 20 min or shorter. In addition, the time period required for permeation of a part of the dye composition into the ophthalmic lens and formation of an interface with the ambient air by the rest is not particularly limited, it is, for example, 10 sec or longer and 3 min or shorter.

[Polymerization Step (3)]

In the step (3) described above, an energy is applied to dye composition coated on the ophthalmic lens in the above step (2) to allow for radical polymerization and curing, whereby the cured matter is fixed to the ophthalmic lens. Polymerization of the dye as the component (A) per se, or polymerization of the dye as the component (A) and the monomer (D) is initiated by applying the energy to generate a radical (free group) from the radical polymerization initiator as the component (B). As the mode in methods for charging such an energy, any one of an active energy ray (rays of light such as ultraviolet light or visible light (electromagnetic wave)) and heat, or any combination of more than one of these may be employed. As the apparatus for generating an active energy ray, any well-known apparatus may be used, and for example, a generator in which a high-pressure mercury vapor lamp is used, a black light, an LED apparatus, or the like is applicable. For example, upon irradiation of ultraviolet light, an ultraviolet ray irradiation apparatus having a maximum wavelength at around 365 nm may be used to apply an ultraviolet ray for 30 to 60 sec, whereby a cured matter may be formed. On the other hand, a well-known apparatus may be used as an apparatus for generating heat, and a thermoregulated bath which enables to adjust at an appropriate temperature, or the like may be employed.

The step of applying energy to the dye composition coated on an ophthalmic lens in such a manner may be performed in the state in which the dye composition has been completely permeated into the ophthalmic lens, or a state in which a part of the dye composition has permeated into the ophthalmic lens and the rest forms an interface with the ambient air, according to the step (2) described above. In the former case, a polymer network structure of the cured matter is formed by radical polymerization in the state in which the dye composition has been completely permeated into the ophthalmic lens, and thus the dye is fixed in the ophthalmic lens. Therefore, the resulting dyed printing is involved inside the ophthalmic lens as a polymer network structure, and conceived to form a interpenetrating network structure with the network structure of the polymer material of the lens substrate. According to such an interpenetrating network structure, the cured matter is strongly fixed inside the ophthalmic lens, whereby a stable dyed printing having extremely superior durability can be obtained. On the other hand, in the latter case, a polymer network structure of the cured matter is formed by radical polymerization in the state in which a part of the dye composition has been permeated into the ophthalmic lens, and thus the dye is fixed in the ophthalmic lens. In this process, a part of the dyed printing may be protruded from the surface of the ophthalmic lens; however, an interpenetrating network structure similar to one described above is formed with the substrate of the ophthalmic lens since a part of the dye composition is permeated into the ophthalmic lens, and then polymerized and cured. Therefore, also in such a case in which energy is imparted to allow for radical polymerization in the state with a part of the dye composition being thus permeated into the ophthalmic lens, the cured matter is strongly fixed to the ophthalmic lens. Accordingly, a stable dyed printing having extremely superior durability can be obtained. In such dyeing using the present dye composition, any of the methods for producing a colored ophthalmic lens, or a method of combination of the same may be selected depending on the type of printing as well as use of the dyeing.

According to such a method for producing a colored ophthalmic lens, dyeing operation can be carried out by a convenient manipulation since curing and fixation of a dye composition are enabled by merely using an electromagnetic wave or heat, without using a large quantity of an alkali solution or fixing solution. In addition, according to this method for producing a colored ophthalmic lens, dyeing can be executed accurately on a fine ophthalmic lens subject by using an ink-jet coating equipment.

[Heat Applying Step]

In the method for producing a colored ophthalmic lens, it is preferred to further include a heat applying step of applying heat to the ophthalmic lens prior to and/or concomitant with the step (1) described above. In this heat applying step, heat may be applied to the entirety of the ophthalmic lens, or only near the area where the ophthalmic lens is to be dyed. The heat applying step refers to a stage during which heat is applied to the ophthalmic lens by a method such as heating described later. It is to be noted that when the heat applying step is included, the permeation step (2) may not be required since the permeation step (2) is additionally promoted, or a permeation effect similar to the permeation step (2) can be exerted.

The method for applying heat is not particularly limited as long as it can elevate the temperature of the ophthalmic lens. For example, a method in which the ophthalmic lens is allowed to stand still under a high-temperature condition using a thermoregulated bath or the like, a method in which heating of the is carried out using a heat generator such as a heater, an incandescent light bulb or the like, a method in which the ophthalmic lens is irradiated using an irradiation apparatus for generating an electromagnetic ray such as far infrared radiation, etc., a method in which hot air is fed to the ophthalmic lens using a dryer, etc., and the like may be exemplified. In any case, it is preferred to set and maintain the temperature of the ophthalmic lens at a desired level, or change the temperature as needed by programming the temperature control. The quality of the dyeing can be maintained at a constant level by thus constructed method. In addition, generation of deposits or residues of the dye on the surface of the lens can be further effectively suppressed by strictly controlling the temperature of the ophthalmic lens.

The temperature of the ophthalmic lens attained in the heat applying step is not particularly limited, but the lower limit of the temperature of the ophthalmic lens when the heat applying step is completed is preferably 50° C., more preferably 60° C., and still more preferably 70° C. On the other hand, the upper limit of the temperature of the ophthalmic lens when the heat applying step is completed is preferably 150° C., more preferably 135° C., and still more preferably 120° C. When the temperature of the ophthalmic lens in completing the heat applying step is lower than the lower limit described above, the permeation rate of the dye composition for an ophthalmic lens into the ophthalmic lens substrate decreases, whereby the dyeing may take a long period of time. To the contrary, when the temperature of the ophthalmic lens in completing the heat applying step is higher than the upper limit described above, deformation and the like of the ophthalmic lens substrate may occur.

Moreover, the lower limit of the temperature of the ophthalmic lens when the step (1) is completed is preferably 30° C., more preferably 40° C., and still more preferably 50° C. On the other hand, the upper limit of the temperature of the ophthalmic lens when the step (1) is completed is preferably 90° C., more preferably 75° C., and still more preferably 60° C. When the temperature of the ophthalmic lens in completing the step (1) is lower than the lower limit described above, the diffusion velocity of the dye inside the lens substrate decreases, and thus a sharp dyed printing that is accompanied by less and bleeding may not be obtained. To the contrary, when the temperature of the ophthalmic lens in completing the step (1) is higher than the upper limit described above, uneven permeation of the dye into the lens substrate is executed, whereby a homogenous dyed printing may not be obtained. It is to be noted that the temperature of the ophthalmic lens refers to a temperature of the lens surface in the vicinity of the site where the dye composition for an ophthalmic lens adhered, in these cases.

Time period of applying heat is not particularly limited and may be determined ad libitum depending on the method for applying heat and desired temperature of the ophthalmic lens to be attained, but is preferably not longer than 10 min, more preferably not longer than 5 min, and still more preferably not longer than 3 min. When the time period of applying heat exceeds 10 min, operation time in the step is lengthened, and thus may lead to deterioration of productivity, and increase in cost that results therefrom.

[Relation Between Step (1) and Heat Applying Step]

In method for producing a colored ophthalmic lens of the present invention, the heat applying step is carried out prior to and/or concomitant with the step (1). In other words, the heat applying step is carried out any one of: 1) prior to, 2) concomitant with, 3) prior to and concomitant with the step (1). Of these, the timing of 1) prior to, or 3) prior to and concomitant is preferred, and 3) prior to and concomitant with the step (1) is more preferred. Although any case is acceptable, the temperature of the lens substrate can be maintained at no lower than a certain temperature from the initial permeation stage of the dye by providing the heat applying step prior to the step (1), and also the temperature of the dye composition for an ophthalmic lens adhered on the surface of the lens can be effectively elevated. As a result, permeation of the dye into the lens substrate is promoted from the initial permeation stage of the dye, and solubility of the dye in the dye composition for an ophthalmic lens present on the lens surface is improved, whereby generation of deposits or residues of the dye on the surface of the lens can be further reduced. Concurrently, the temperature of the lens substrate being no lower than a certain temperature from the initial permeation stage further accelerates diffusion velocity of the dye molecules inside the lens substrate, and thus a sharper dyed printing accompanied by less bleeding can be obtained.

In the method for producing a colored ophthalmic lens, by including the heat applying step at any stage with respect to the step (1) as described above, the dye composition for an ophthalmic lens can be permeated into the lens substrate easily and certainly, with scarcely generating deposits or residues of the dye on the surface of the ophthalmic lens. The reasons for this event are envisaged as in the following. Specifically, by applying heat to the ophthalmic lens prior to the step (1), the temperature of the ophthalmic lens per se, as well as the temperature of the dye composition for an ophthalmic lens adhered on the surface of the lens can be elevated to no lower than a certain temperature from the initial permeation stage of the dye. As a consequence, the molecular motion of the polymer network constructing the lens substrate is activated to increase the diffusion coefficient of the dye molecules in the lens substrate, and thus the permeation rate of the dye molecules into the lens substrate increases, whereby remaining dye on the lens surface is reduced to suppress generation of the residues. On the other hand, permeation rate of medium molecules into the lens substrate is greater as compared with that of dye molecules in general; therefore, deposition of the dye may be caused due to increase in the dye concentration in droplets of the dye composition for an ophthalmic lens adhered on the surface of the lens with time. However, when the temperature of such droplets is no lower than a certain temperature from the initial permeation stage thereof, saturated concentration at which the dye molecules can dissolve, aggregate or associate in the medium is elevated, whereby the dye can be maintained in the dissolved state to result in suppression of the dye deposition. Accordingly, by applying heat prior to the step (1), it is believed that a synergistic effect of promotion of diffusion of the dye molecules, and improvement of solubility of the dye is exerted, whereby assured permeation of the dye can be achieved with scarcely generating deposits or residues of the dye on the surface of the lens.

It is preferred that the heat applying step described above is further included subsequent to the step (1). Thus, the heat applying step is preferably carried out any one of: a) prior to and subsequent to, b) concomitant with and subsequent to, c) prior to, concomitant with and subsequent to the step (1). When the heat application to the ophthalmic lens is additionally carried out also subsequent to the step (1), the temperature of the lens substrate can be maintained at no lower than a certain temperature from the initial permeation stage of the dye until the stage of permeation proceeded. As a result, the permeation of the dye into the lens substrate can be continuously promoted, and the solubility of the dye in the dye composition for an ophthalmic lens on the lens surface is also continuously improved, whereby generation of deposits or residues of the dye is further reduced. Of the foregoing, in light of possibility of obtaining a sharper dyed printing without less bleeding, the heat applying step is carried out preferably a) prior to and subsequent to, or c) prior to, concomitant with and subsequent to the step (1), and particularly preferably c) prior to, concomitant with and subsequent to the step (1).

[Colored Ophthalmic Lens]

By employing, for example, the method for producing a colored ophthalmic lens including the aforementioned steps (1) to (3), a colored ophthalmic lens can be obtained having a cured matter obtained by curing the dye composition on at least a part of the surface layer of an ophthalmic lens such as a contact lens.

Such a colored ophthalmic lens is extremely superior in elution resistance as described above, and has a dyed printing that is semipermanently stable with seldom elution. This dyed printing exhibits characteristics of extremely superior durability, accompanied by no elution of the dye even when swollen, boiled, or washed with water. Thus superior elution resistance of the colored ophthalmic lens is considered to be achieved by: a radical reaction of the dye molecule with an electromagnetic wave or the like to permit polymerization in the network structure of the polymer constituting the ophthalmic lens, or a graft reaction with the polymer of the ophthalmic lens to permit strong fixation of the dye molecules to the ophthalmic lens. Since this colored ophthalmic lens has superior elution resistance, is very excellent in terms of safety. Accordingly, providing consumers with ophthalmic lenses having high commercial value and reliability is enabled.

EXAMPLES

Hereinafter, the present invention is explained in more detail by way of Example, but the present invention should not be construed as limitation based on the description of Examples.

Preparation of Dye Composition for Ophthalmic Lens

Example 1

A dye composition for an ophthalmic lens was prepared by mixing 0.2 parts by mass of 1,4-bis((ethenylphenyl)amino)-anthraquinone as a dye of the component (A), 0.5 parts by mass of 2-hydroxy-2-methyl-1-phenylpropane-1-one as a radical polymerization initiator of the component (B), 10 parts by mass of 1-methyl-3-methylene-2-pyrrolidinone as the monomer (D), and 1 part by mass of ethylene glycol dimethacrylate. Next, using a piezo ink-jet coating equipment, this dye composition was coated on the surface of the external face side of a hydrous soft contact lens having a silicone group (not having a group that is reactive with a reactive dye) such that a line pattern composed of dots was formed. After coating, the lens was allowed to stand still for 3 min, and confirmed that the entirety of the dye composition was permeated into the lens substrate by microscopic observation. In this state, the dye composition was polymerized and cured by irradiating the lens with a ultraviolet ray at a maximum wavelength of 365 nm for 40 sec using a ultraviolet ray irradiator "UV Spot-Cure UIS-250-01" manufactured by Ushio, Inc. as an irradiation apparatus to obtain a hydrous soft contact lens having a dyed printing on the surface layer.

Examples 2 to 44 and Comparative Examples 1 to 4

Hydrous soft contact lenses having a dyed printing on the surface layer according to Examples 2 to 44 and Comparative Examples 1 to 4 were obtained similarly to Example 1 except that the component compositions were changed as shown in Tables 1 to 4. Note that Example is represented by an abbreviation of "Ex", and Comparative Example is represented by an abbreviation of "Cp" in Tables.

Example 45

A dye composition for an ophthalmic lens was prepared by mixing components similar to those in Example 1. Next, using a piezo ink-jet coating equipment, this dye composition was coated on the surface of the external face side of a hydrous soft contact lens having a silicone group such that a line pattern composed of dots was formed. Continuous microscopic observation of the was started immediately after the coating, and the state in which a part of the coated dye composition is permeated into the lens, and the rest forms an interface with the ambient air was confirmed about 60 seconds later. In this state, the dye composition was polymerized and cured by irradiating the lens with a ultraviolet ray at a maximum wavelength of 365 nm for 40 sec using a ultraviolet ray irradiator "UV Spot-Cure UIS-250-01" manufactured by Ushio, Inc. as an irradiation apparatus to obtain a hydrous soft contact lens having a dyed printing on the surface layer.

Examples 46 to 47

Hydrous soft contact lenses having a dyed printing on the surface layer according to Examples 46 to 47 were obtained similarly to Example 45 except that the component compositions were changed as shown in Table 4.

Example 48

A dye composition for an ophthalmic lens was prepared by mixing 0.1 parts by mass of 1,4-bis((ethenylphenyl)amino)-anthraquinone and 0.1 parts by mass of 1-phenylazo-3-methacryloyloxy-2-naphthol as dyes of the component (A), 0.5 parts by mass of benzoinmethyl ether as a radical polymerization initiator of the component (B), and 10 parts by mass of 1-methyl-3-methylene-2-pyrrolidinone as the monomer (D). Next, using a piezo ink-jet coating equipment, this dye composition was coated on the surface of the external face side of a hydrous soft contact lens containing silicone (not having a group that is reactive with a reactive dye) such that an iris pattern was formed. Microscopic observation confirmed that the entirety of the dye composition was permeated into the lens substrate. In this state, the dye composition was polymerized and cured by irradiating the lens with a ultraviolet ray at a maximum wavelength of 365 nm for 5 sec using a ultraviolet ray irradiator "UV Spot-Cure UIS-250-01" manufactured by Ushio, Inc. as an irradiation apparatus to obtain a silicone-containing hydrous soft contact lens having a dyed printing with an iris pattern on the surface layer.

Evaluation of physical properties of the hydrous soft contact lens having a dyed printing on the surface layer produced as described above was made according to the following methods.

[Autoclaving Resistance]

Two cycles of a treatment of steam sterilization under pressure in physiological saline at a temperature of 121° C. for 20 min were carried out, followed by ascertainment of visibility of the dyed printing with eyes (extent of clear distinguishability of the line pattern of the dyed printing) to evaluate as in the following. The results are shown in Tables 1 to 4.

A: visibility being favorable; and

C: visibility being unfavorable.

[Solvent Resistance]

The sample was immersed in ethanol at a temperature of 30° C. for 6 hrs, followed by ascertainment of visibility of the dyed printing with eyes (extent of clear distinguishability of the line pattern of the dyed printing) to evaluate as in the following. The results are shown in Tables 1 to 4. Note that evaluation of the solvent resistance on Comparative Examples 1 to 4 was not carried out since fading was ascertained in the evaluation of autoclaving resistance.

A: visibility being favorable; and
C: visibility being unfavorable.

TABLE 1

| | Component (parts by mass) | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|
| Component (A): dye having a carbon-carbon double bond | 1,4-bis((ethenylphenyl) amino)-anthraquinone | 0.2 | — | — | — | 0.2 | 0.2 | 0.2 | 0.15 | — | 0.2 | 1 | — | — | 0.2 |
| | 1,8-bis((ethenylphenyl) amino)-anthraquinone | — | 0.2 | — | — | — | — | — | — | — | — | — | — | — | — |
| | 1-((ethenylphenyl) amino)-anthraquinone | — | — | — | — | — | — | — | — | — | — | — | — | — | — |
| | 1-phenylazo-3-methacryloyloxy-2-naphthol | — | — | — | — | — | — | — | — | — | — | — | — | — | — |
| | 1-((4-(phenylazo)phenyl)azo)-3-methacryloyloxy-2-naphthol | — | — | 0.2 | — | — | — | — | — | 0.15 | — | — | 1.5 | 0.3 | — |
| | 2,4-dihydroxy-5-(4-(2-(N-(2-methacryloyloxyethyl) carbamoyloxy)ethyl) phenylazo)benzophenone | — | — | — | 0.2 | — | — | — | — | — | — | — | — | — | — |
| | tetra-(4-methacrylamide) copper phthalocyanine | — | — | — | — | 0.2 | — | — | — | — | — | — | — | — | — |
| Component (B): radical polymerization initiator | 2-hydroxy-2-methyl-1-phenylpropane-1-one | 0.5 | 0.5 | 0.5 | 0.5 | 0.5 | — | — | — | — | 0.5 | 1 | — | — | 0.5 |
| | benzoinmethyl ether | — | — | — | — | — | — | 0.5 | 0.5 | 0.5 | — | — | 5 | 1 | — |
| | 2,2'-azobis-(2,4-dimethylvaleronitrile) | — | — | — | — | — | 0.5 | — | — | — | — | — | — | — | — |
| | benzophenone | — | — | — | — | — | — | — | — | — | — | — | — | — | — |
| | benzoinethyl ether | — | — | — | — | — | — | — | — | — | — | — | — | — | — |
| Component (C): solvent | N-methyl-2-pyrrolidone | — | — | — | — | — | — | — | — | — | 10 | 90 | 90 | 10 | — |
| | acetone | — | — | — | — | — | — | — | — | — | — | — | — | — | 3 |
| | tetrahydrofuran | — | — | — | — | — | — | — | — | — | — | — | — | — | — |
| Component (D): radical polymerizable monomer | 1-methyl-3-methylene-2-pyrrolidinone | 10 | 10 | 10 | 10 | 10 | 10 | 10 | 10 | 10 | 10 | 10 | 10 | 10 | 10 |
| | tris(trimethylsiloxy) silylpropyl methacrylate | — | — | — | — | — | — | — | — | — | — | — | — | — | — |
| | glycerol methacrylate | — | — | — | — | — | — | — | — | — | — | — | — | — | — |
| | methoxyethyl acrylate | — | — | — | — | — | — | — | — | — | — | — | — | — | — |
| | ethylene glycol dimethacrylate | 1 | 1 | 1 | 1 | — | 1 | 1 | — | 1 | 1 | 2 | — | — | 1 |
| | 4-vinylbenzyl methacrylate | — | — | — | — | 1 | — | — | — | — | — | — | — | — | — |
| Nonreactive dye | D&C Green No. 6 | — | — | — | — | — | — | — | — | — | — | — | — | — | — |
| | D&C Red No. 17 | — | — | — | — | — | — | — | — | — | — | — | — | — | — |
| Surfactant | polyoxyethylene hydrogenated castor oil 10 | — | — | — | — | — | — | — | — | — | — | — | — | — | — |
| | polyoxyethylene hydrogenated castor oil 100 | — | — | — | — | — | — | — | — | — | — | — | — | — | — |
| Permeation type of dye composition | | complete | complete | complete | complete | complete | complete | complete | complete | complete | complete | complete | complete | complete | complete |
| Evaluation of physical properties of dyed lens | autoclaving resistance | A | A | A | A | A | A | A | A | A | A | A | A | A | A |
| | solvent resistance | A | A | A | A | A | A | A | A | A | A | A | A | A | A |

TABLE 2

| | Component (parts by mass) | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|---|---|---|---|---|
| Component (A): dye having a carbon-carbon double bond | 1,4-bis((ethenylphenyl) amino)-anthraquinone | 0.2 | — | 0.2 | 0.05 | — | — | 0.15 | 0.15 | — | — | 0.15 | 0.15 | — | 0.15 |
| | 1,8-bis((ethenylphenyl) amino)-anthraquinone | — | — | — | — | — | — | — | — | — | — | — | — | — | — |
| | 1-((ethenylphenyl) amino)-anthraquinone | — | — | — | — | — | — | — | — | — | — | — | — | — | — |
| | 1-phenylazo-3-methacryloyloxy-2-naphthol | — | — | — | — | — | — | — | — | — | — | — | — | — | — |
| | 1-((4-(phenylazo)phenyl)azo)-3-methacryloyloxy-2-naphthol | — | — | — | — | — | — | — | — | — | 0.1 | — | — | 0.15 | — |

TABLE 2-continued

| | Component (parts by mass) | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|---|---|---|---|---|
| | 2,4-dihydroxy-5-(4-(2-(N-(2-methacryloyloxyethyl)carbamoyloxy)ethyl)phenylazo)benzophenone | — | — | — | — | — | — | — | — | — | 0.1 | — | — | — | — |
| | tetra-(4-methacrylamide) copper phthalocyanine | — | 0.5 | — | — | 0.25 | 0.5 | — | — | — | — | — | — | — | — |
| Component (B): radical polymerization initiator | 2-hydroxy-2-methyl-1-phenylpropane-1-one | 0.5 | 0.5 | 1 | 1 | 0.5 | 0.5 | 0.5 | 0.25 | 0.25 | 0.25 | 0.1 | — | — | — |
| | benzoinmethyl ether | — | — | — | — | — | — | — | — | — | — | — | 1 | 1 | 0.75 |
| | 2,2'-azobis-(2,4-dimethylvaleronitrile) | — | — | — | — | — | — | — | — | — | — | — | — | — | — |
| | benzophenone | — | — | — | — | — | — | — | — | — | — | — | — | — | — |
| | benzoinethyl ether | — | — | — | — | — | — | — | — | — | — | — | — | — | — |
| Component (C): solvent | N-methyl-2-pyrrolidone | — | 10 | 10 | — | — | — | 10 | 10 | 10 | 10 | 10 | 10 | 10 | 10 |
| | acetone | — | — | — | — | — | — | — | — | — | — | — | — | — | — |
| | tetrahydrofuran | 10 | — | — | — | — | — | — | — | — | — | — | — | — | — |
| Component (D): radical polymerizable monomer | 1-methyl-3-methylene-2-pyrrolidinone | 10 | — | 10 | 10 | 10 | — | — | — | — | — | — | — | — | — |
| | tris(trimethylsiloxy) silylpropyl methacrylate | — | — | — | 10 | — | — | — | — | — | — | — | — | — | — |
| | glycerol methacrylate | — | 10 | — | — | 5 | — | — | — | — | — | — | — | — | — |
| | methoxyethyl acrylate | — | — | — | — | — | 10 | — | — | — | — | — | — | — | — |
| | ethylene glycol dimethacrylate | 1 | 0.1 | — | 1 | 1 | 1 | — | — | — | — | — | — | — | — |
| | 4-vinylbenzyl methacrylate | — | — | — | — | — | — | — | — | — | — | — | — | — | — |
| Nonreactive dye | D&C Green No. 6 | — | — | — | — | — | — | — | — | — | — | — | — | — | — |
| | D&C Red No. 17 | — | — | — | — | — | — | — | — | — | — | — | — | — | — |
| Surfactant | polyoxyethylene hydrogenated castor oil 10 | — | — | — | — | — | — | — | — | — | — | — | — | — | — |
| | polyoxyethylene hydrogenated castor oil 100 | — | — | — | — | — | — | — | — | — | — | — | — | — | — |
| Permeation type of dye composition | | complete | complete | complete | complete | complete | complete | complete | complete | complete | complete | complete | complete | complete | complete |
| Evaluation of physical properties of dyed lens | autoclaving resistance | A | A | A | A | A | A | A | A | A | A | A | A | A | A |
| | solvent resistance | A | A | A | A | A | A | A | A | A | A | A | A | A | A |

TABLE 3

| | Component (parts by mass) | Ex. 29 | Ex. 30 | Ex. 31 | Ex. 32 | Ex. 33 | Ex. 34 | Ex. 35 | Ex. 36 | Ex. 37 | Ex. 38 | Ex. 39 | Ex. 40 | Ex. 41 | Ex. 42 |
|---|---|---|---|---|---|---|---|---|---|---|---|---|---|---|---|
| Component (A): dye having a carbon-carbon double bond | 1,4-bis((ethenylphenyl)amino)-anthraquinone | — | 0.15 | — | — | — | 0.15 | — | 0.15 | — | 0.15 | — | — | — | — |
| | 1,8-bis((ethenylphenyl)amino)-anthraquinone | — | — | — | — | — | — | — | — | — | — | — | — | — | — |
| | 1-((ethenylphenyl)amino)-anthraquinone | — | — | — | 0.15 | — | — | — | — | — | — | — | — | — | — |
| | 1-phenylazo-3-methacryloyloxy-2-naphthol | — | — | — | — | 0.15 | — | — | — | — | — | — | 0.15 | — | — |
| | 1-((4-(phenylazo)phenyl)azo)-3-methacryloyloxy-2-naphthol | 0.15 | — | 0.15 | — | — | — | 0.15 | — | 0.15 | — | 0.15 | — | 0.2 | 0.2 |
| | 2,4-dihydroxy-5-(4-(2-(N-(2-methacryloyloxyethyl)carbamoyloxy)ethyl)phenylazo)benzophenone | — | — | — | — | — | — | — | — | — | — | — | — | — | — |
| | tetra-(4-methacrylamide) copper phthalocyanine | — | — | — | — | — | — | — | — | — | — | — | — | — | — |
| Component (B): radical polymerization initiator | 2-hydroxy-2-methyl-1-phenylpropane-1-one | — | — | — | — | — | — | — | — | — | — | — | — | — | — |
| | benzoinmethyl ether | 0.75 | 0.5 | 0.5 | 0.5 | 0.5 | 0.25 | 0.25 | 0.1 | 0.1 | — | — | — | 5 | 5 |
| | 2,2'-azobis-(2,4-dimethylvaleronitrile) | — | — | — | — | — | — | — | — | — | — | — | — | — | — |
| | benzophenone | — | — | — | — | — | — | — | — | — | 0.5 | 0.5 | 0.5 | — | — |
| | benzoinethyl ether | — | — | — | — | — | — | — | — | — | — | — | — | — | — |
| Component (C): solvent | N-methyl-2-pyrrolidone | 10 | 10 | 10 | 10 | 10 | 10 | 10 | 10 | 10 | 10 | 10 | 10 | 10 | 10 |
| | acetone | — | — | — | — | — | — | — | — | — | — | — | — | — | — |
| | tetrahydrofuran | — | — | — | — | — | — | — | — | — | — | — | — | — | — |
| Component (D): radical | 1-methyl-3-methylene-2-pyrrolidinone | | | | | | | | | | | | | | |

TABLE 3-continued

| | Component (parts by mass) | Ex. 29 | Ex. 30 | Ex. 31 | Ex. 32 | Ex. 33 | Ex. 34 | Ex. 35 | Ex. 36 | Ex. 37 | Ex. 38 | Ex. 39 | Ex. 40 | Ex. 41 | Ex. 42 |
|---|---|---|---|---|---|---|---|---|---|---|---|---|---|---|---|
| polymerizable monomer | tris(trimethylsiloxy) silylpropyl methacrylate | — | — | — | — | — | — | — | — | — | — | — | — | — | — |
| | glycerol methacrylate | — | — | — | — | — | — | — | — | — | — | — | — | — | — |
| | methoxyethyl acrylate | — | — | — | — | — | — | — | — | — | — | — | — | — | — |
| | ethylene glycol dimethacrylate | — | — | — | — | — | — | — | — | — | — | — | — | — | — |
| | 4-vinylbenzyl methacrylate | — | — | — | — | — | — | — | — | — | — | — | — | — | — |
| Nonreactive dye | D&C Green No. 6 | — | — | — | — | — | — | — | — | — | — | — | — | — | — |
| | D&C Red No. 17 | — | — | — | — | — | — | — | — | — | — | — | — | — | — |
| Surfactant | polyoxyethylene hydrogenated castor oil 10 | — | — | — | — | — | — | — | — | — | — | — | — | 0.1 | 0.5 |
| | polyoxyethylene hydrogenated castor oil 100 | — | — | — | — | — | — | — | — | — | — | — | — | — | — |
| Permeation type of dye composition | | complete | complete | complete | complete | complete | complete | complete | complete | complete | complete | complete | complete | complete | complete |
| Evaluation of physical properties of dyed lens | autoclaving resistance | A | A | A | A | A | A | A | A | A | A | A | A | A | A |
| | solvent resistance | A | A | A | A | A | A | A | A | A | A | A | A | A | A |

TABLE 4

| | Component (parts by mass) | Ex. 43 | Ex. 44 | Ex. 45 | Ex. 46 | Ex. 47 | Ex. 48 | Ex. 49 | Ex. 50 | Ex. 51 | Ex. 52 | Cp. 1 | Cp. 1 | Cp. 3 | Cp. 4 |
|---|---|---|---|---|---|---|---|---|---|---|---|---|---|---|---|
| Component (A): dye having a carbon-carbon double bond | 1,4-bis((ethenylphenyl)amino)-anthraquinone | — | — | 0.2 | — | — | 0.1 | 0.25 | — | — | 0.2 | — | — | — | — |
| | 1,8-bis((ethenylphenyl)amino)-anthraquinone | — | — | — | — | — | — | — | — | — | — | — | — | — | — |
| | 1-((ethenylphenyl)amino)-anthraquinone | — | — | — | — | — | — | — | — | — | — | — | — | — | — |
| | 1-phenylazo-3-methacryloyloxy-2-naphthol | — | — | — | — | — | 0.1 | — | — | 0.25 | — | — | — | — | — |
| | 1-((4-(phenylazo)phenyl)azo)-3-methacryloyloxy-2-naphthol | 0.2 | 0.2 | — | — | — | — | — | 0.25 | — | — | — | — | — | — |
| | 2,4-dihydroxy-5-(4-(2-(N-(2-methacryloyloxyethyl)carbamoyloxy)ethyl)phenylazo)benzophenone | — | — | — | — | — | — | — | — | — | — | — | — | — | — |
| | tetra-(4-methacrylamide) copper phthalocyanine | — | — | — | 0.2 | 0.1 | — | — | — | — | — | — | — | — | — |
| Component (B): radical polymerization initiator | 2-hydroxy-2-methyl-1-phenylpropane-1-one | — | — | 0.5 | 0.5 | 0.5 | — | 0.5 | — | — | — | 0.5 | 0.5 | 0.5 | 0.5 |
| | benzoinmethyl ether | 5 | 5 | — | — | — | 0.5 | — | — | — | — | — | — | — | — |
| | 2,2'-azobis-(2,4-dimethylvaleronitrile) | — | — | — | — | — | — | — | — | — | — | — | — | — | — |
| | benzophenone | — | — | — | — | — | — | — | — | — | — | — | — | — | — |
| | benzoinethyl ether | — | — | — | — | — | — | — | 0.5 | 0.5 | 0.5 | — | — | — | — |
| Component (C): solvent | N-methyl-2-pyrrolidone | 10 | 10 | 10 | 10 | 10 | — | 10 | 10 | 10 | — | — | — | 10 | 10 |
| | acetone | — | — | — | — | — | — | — | — | — | — | — | — | — | — |
| | tetrahydrofuran | — | — | — | — | — | — | — | — | — | — | — | — | — | — |
| Component (D): radical polymerizable monomer | 1-methyl-3-methylene-2-pyrrolidinone | — | — | 10 | 10 | — | 10 | — | — | — | 10 | 10 | 10 | — | — |
| | tris(trimethylsiloxy)silylpropyl methacrylate | — | — | — | — | — | — | — | — | — | — | — | — | — | — |
| | glycerol methacrylate | — | — | — | — | 10 | — | — | — | — | — | — | — | — | — |
| | methoxyethyl acrylate | — | — | — | — | — | — | — | — | — | — | — | — | — | — |
| | ethylene glycol dimethacrylate | — | — | 1 | 1 | 0.2 | — | — | — | — | — | 1 | 1 | — | — |
| | 4-vinylbenzyl methacrylate | — | — | — | — | — | — | — | — | — | — | — | — | — | — |
| Nonreactive dye | D&C Green No. 6 | — | — | — | — | — | — | — | — | — | — | 0.2 | — | 0.15 | — |
| | D&C Red No. 17 | — | — | — | — | — | — | — | — | — | — | — | 0.2 | — | 0.15 |
| Surfactant | polyoxyethylene hydrogenated castor oil 10 | — | — | — | — | — | — | — | — | — | — | — | — | — | — |
| | polyoxyethylene hydrogenated castor oil 100 | 0.1 | 0.5 | — | — | — | — | — | — | — | — | — | — | — | — |
| Permeation type of dye composition | | complete | complete | partial | partial | partial | complete | — | — | — | — | complete | complete | complete | complete |
| Evaluation of physical properties of dyed lens | autoclaving resistance | A | A | A | A | A | A | — | — | — | — | C | C | C | C |
| | solvent resistance | A | A | A | A | A | A | — | — | — | — | — | — | — | — |

Example 49

A dye composition for an ophthalmic lens (a) was prepared by blending 0.25 parts by mass of 1,4-bis((ethenylphenyl)amino)-anthraquinone as a dye of the component (A), 10 parts by mass of N-methyl-2-pyrrolidone as a solvent of the component (C), and 0.5 parts by mass of 2-hydroxy-2-methyl-1-phenylpropane-1-one as a radical polymerization initiator of the component (B), respectively, followed by mixing homogenously to permit dissolution.

Example 50

A dye composition for an ophthalmic lens (b) was prepared by blending 0.25 parts by mass of 1-((4-(phenylazo)phenyl)azo)-3-methacryloyloxy-2-naphthol as a dye of the component (A), 10 parts by mass of N-methyl-2-pyrrolidone as a solvent of the component (C), and 0.5 parts by mass of benzoinethyl ether as a radical polymerization initiator of the component (B), respectively, followed by mixing homogenously to permit dissolution.

Example 51

A dye composition for an ophthalmic lens (c) was prepared by blending 0.25 parts by mass of 1-phenylazo-3-methacryloyloxy-2-naphthol as a dye of the component (A), 10 parts by mass of N-methyl-2-pyrrolidone as a solvent of the component (C), and 0.5 parts by mass of benzoinethyl ether as a radical polymerization initiator of the component (B), respectively, followed by mixing homogenously to permit dissolution.

Example 52

A dye composition for an ophthalmic lens (d) was prepared by blending 0.2 parts by mass of 1,4-bis((ethenylphenyl)amino)-anthraquinone and 0.2 parts by mass of 1-phenylazo-3-methacryloyloxy-2-naphthol as dyes of the component (A), 10 parts by mass of 1-methyl-3-methylene-2-pyrrolidinone as the monomer (D), and 0.5 parts by mass of benzoinethyl ether as a radical polymerization initiator of the component (B), respectively, followed by mixing homogenously to permit dissolution.

Example 53

As the ophthalmic lens, a hydrous contact lens formed from a copolymer prepared with a silicone compound as a constitutive monomer unit (manufactured by Menicon Co., Ltd., Menicon 2 WEEK PremiO) was used. Using an incandescent light bulb (manufactured by OHM Electric Inc., 100 V, 40 W), heat was applied to the contact lens in the dry state for 30 sec. The temperature of the surface of the contact lens after completing the heat applying step measured with a thermocouple-type thermometer (manufactured by Testo K.K., 635-2, probe K thermocouple) was 65° C. Immediately thereafter, the dye composition for an ophthalmic lens (a) was coated using a piezo ink-jet coating equipment to give a linear shape, whereby the dye composition for an ophthalmic lens was brought into contact with the surface of the lens. The temperature near the coated area on the surface of the contact lens subsequent to completing the step (1) measured with a noncontact type thermometer (manufactured by Anritsu Meter Co., Ltd., Dual Thermo AR-1500) was 35° C. Accordingly, a colored ophthalmic lens according to Example 53 was obtained.

Examples 54 to 56

Dyed ophthalmic lenses according to Examples 54 to 56 were obtained by a similar operation to Example 53 except that the dye composition for an ophthalmic lens shown in Table 5 was used.

Example 57

A dyed contact lens according to Example 57 was obtained similarly to Example 53 except that the time period of applying heat was 10 min. The temperature of the surface of the contact lens after completing the heat applying step measured in a similar manner to that described above was 95° C. In addition, the temperature near the coated area on the surface of the contact lens subsequent to completing the step (1) measured in a similar manner to that described above was 45° C.

Example 58

A dyed contact lens according to Example 58 was obtained similarly to Example 53 except that after shortening the distance between the incandescent light bulb and the contact lens, and heat was applied until the temperature of the surface of the contact lens as measured in a similar manner to that described above became 130° C. Time period of applying the heat was 5 minutes. In addition, the temperature near the coated area on the surface of the contact lens subsequent to completing the step (1) measured in a similar manner to that described above was 55° C.

Example 59

A dyed contact lens according to Example 59 was obtained by coating the dye composition for an ophthalmic lens (d) to give a toric shape using the ink-jet coating equipment while applying heat to the contact lens in the dry state using an incandescent light bulb (manufactured by OHM Electric Inc., 100 V, 40 W). The temperature near the coated area on the surface of the contact lens subsequent to completing the step (1) measured in a similar manner to that described above was 40° C.

Example 60

A dyed contact lens according to Example 60 was obtained by coating the dye composition for an ophthalmic lens (a) to give a linear shape using the ink-jet coating equipment while applying heat to the contact lens in the dry state using an incandescent light bulb (manufactured by OHM Electric Inc., 100 V, 40 W), and further applying heat for 10 sec also subsequent to completing the step (1). The temperature near the coated area on the surface of the contact lens subsequent to completing the step (1) measured in a similar manner to that described above was 40° C.

Comparative Example 5

A dyed contact lens according to Comparative Example 1 was obtained by coating the dye composition for an ophthalmic lens (a) to give a linear shape using the ink-jet coating equipment on the contact lens in the dry state at room temperature (22° C.)

Comparative Examples 6 to 9

Dyed contact lenses according to Comparative Examples 6 to 9 were obtained by a similar operation to Comparative Example 5 except that the dye composition for an ophthalmic lens and the coated shape were as shown in Table 5.

[Presence/Absence of Deposition and Residue of Dye]

The dyed printings formed on the surface of the dyed contact lens obtained in each Example and Comparative Example was observed using a stereo microscope (manufactured by Olympus Corporation, SZX16) with 10 times magnification to evaluate as in the following A: deposits or residues of the dye not found on the contact lens surface; and C: deposits or residues of the dye found on the contact lens surface.

Thus obtained results of evaluation are shown in Table 5 together with the heat application time, the distance from the incandescent light bulb, type of the dye composition for an ophthalmic lens used, conditions of the coated shape, and the measurement of the temperature of the ophthalmic lens. Additionally, a stereomicroscopic image of each dyed printing is illustrated in each Figure shown in Table 5.

the dye composition for an ophthalmic lens on the surface of the lens enables the dye to be completely permeated as generation of deposits or residues of the dye was not found on the surface of any of the ophthalmic lenses. On the other hand, generation of deposits or residues of the dye was found on the surface of any of the ophthalmic lenses of Comparative Examples 5 to 9 since heat was not applied to the ophthalmic lens in dyeing. Moreover, comparison of Example 53, Example 57 and Example 58 suggest that still sharper dyed printing accompanied by less bleeding can be obtained as the temperature of the coated area of the ophthalmic lens subsequent to completing the step (1) is higher.

INDUSTRIAL APPLICABILITY

As described in the foregoing, the dye composition for an ophthalmic lens of the present invention can form a dyed printing that is extremely superior in elution resistance and

TABLE 5

Figure 2:
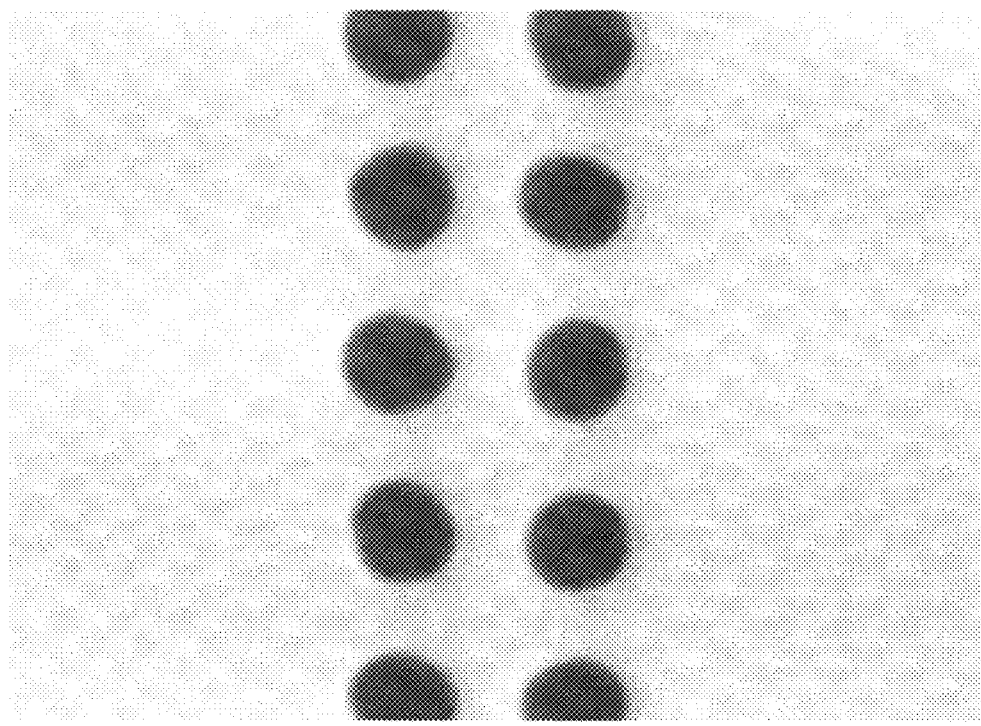
FIG. 2 shows a stereomicroscopic image of a dyed printing formed in Example 54.
Figure 3:
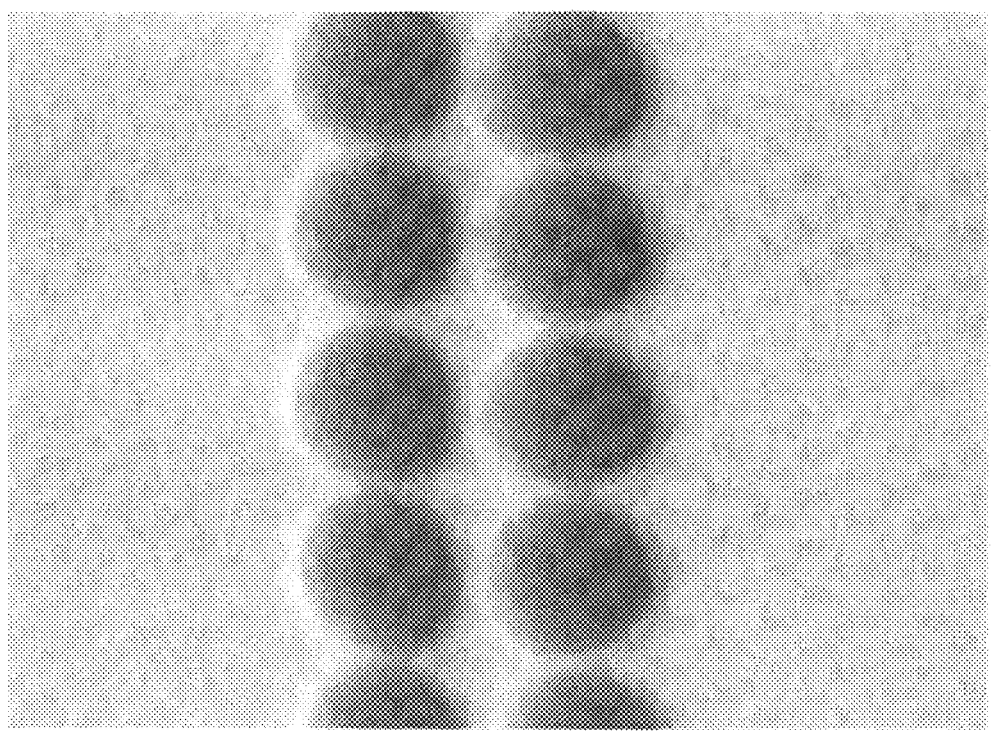
FIG. 3 shows a stereomicroscopic image of a dyed printing formed in Example 55.
Figure 4:
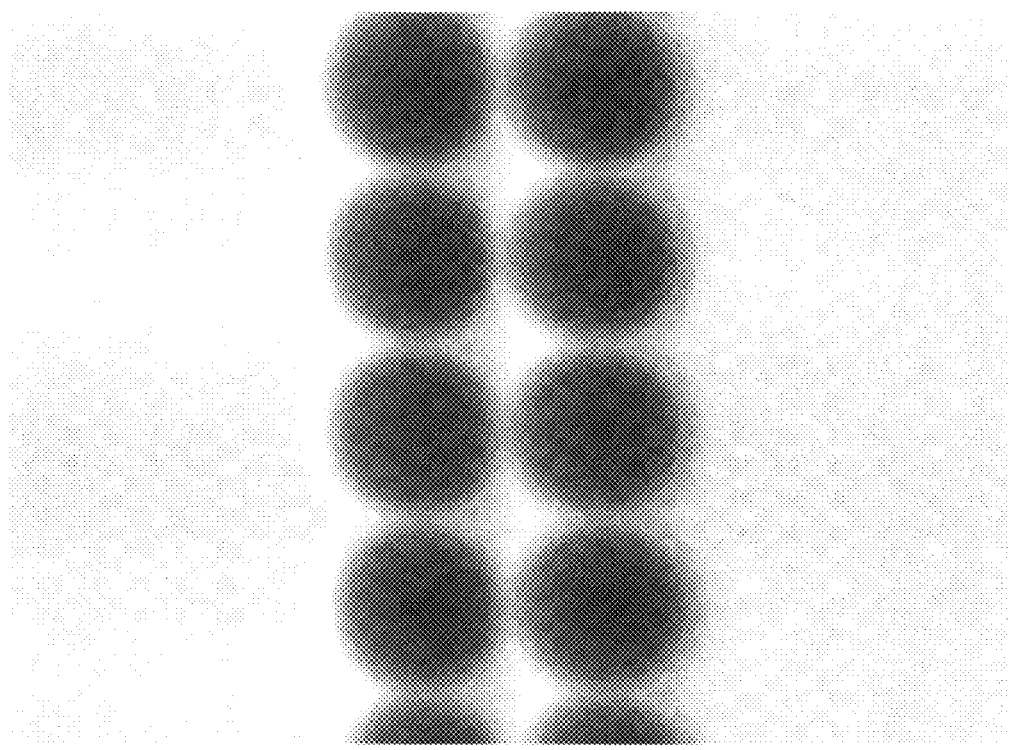
FIG. 4 shows a stereomicroscopic image of a dyed printing formed in Example 56.
Figure 5:
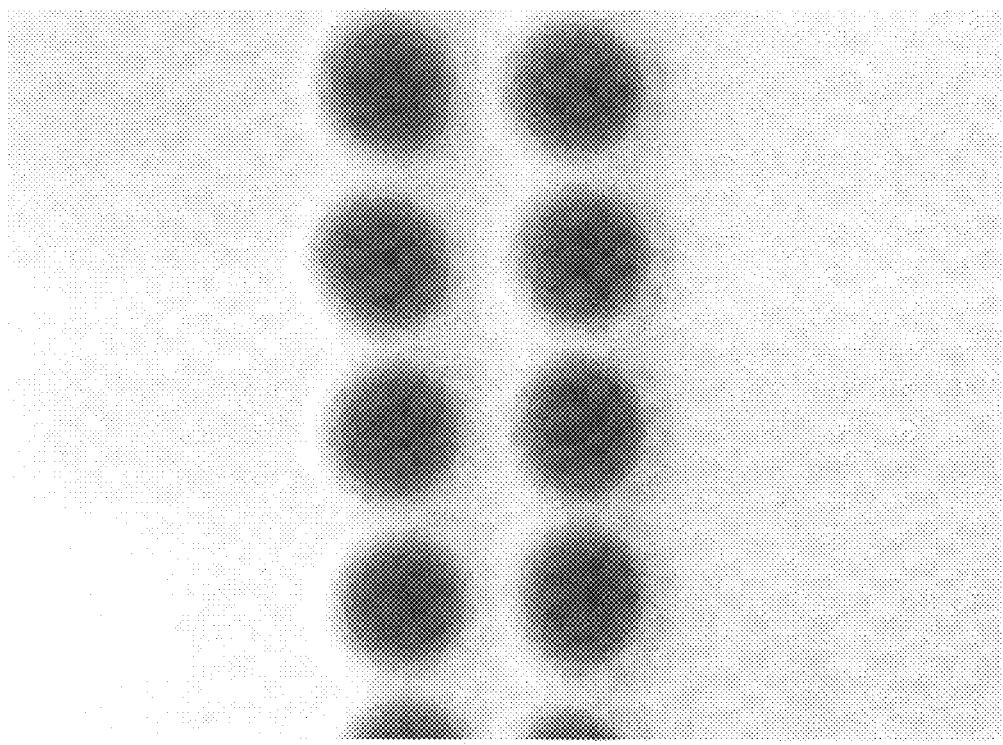
FIG. 5 shows a stereomicroscopic image of a dyed printing formed in Example 57.
Figure 6:
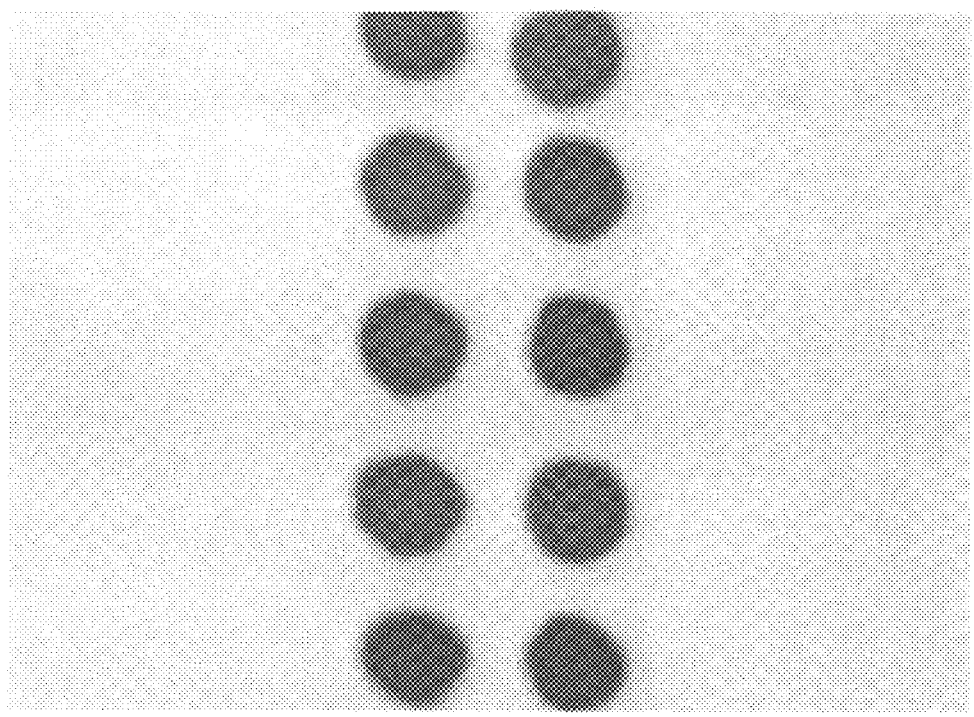
FIG. 6 shows a stereomicroscopic image of a dyed printing formed in Example 58.
Figure 7:
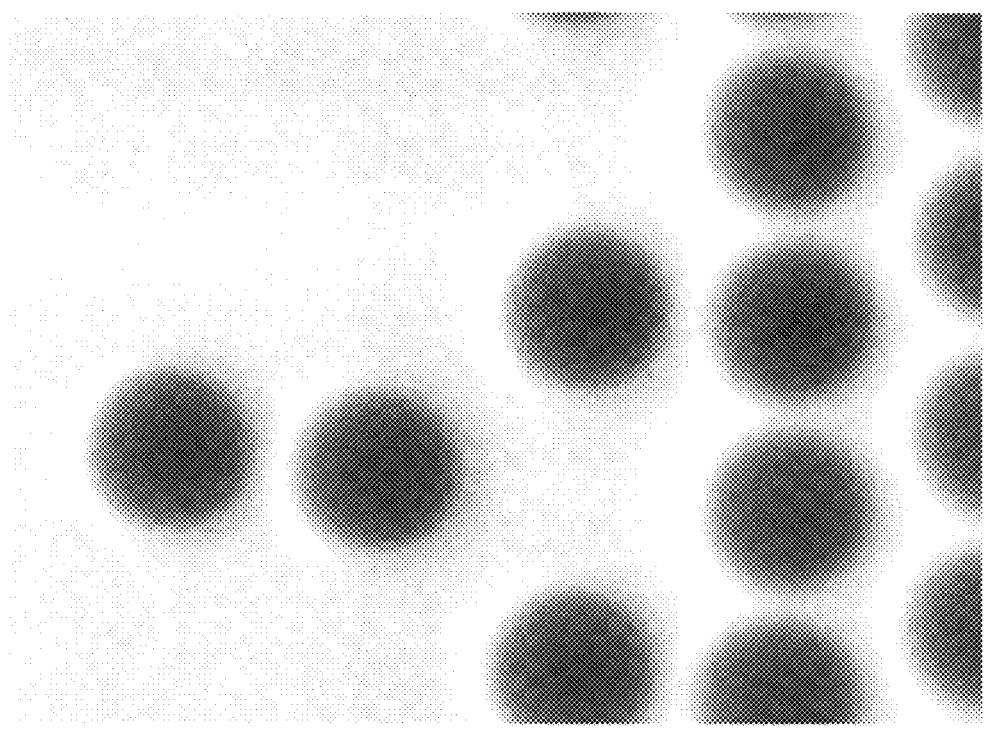
FIG. 7 shows a stereomicroscopic image of a dyed printing formed in Example 59.
Figure 8:
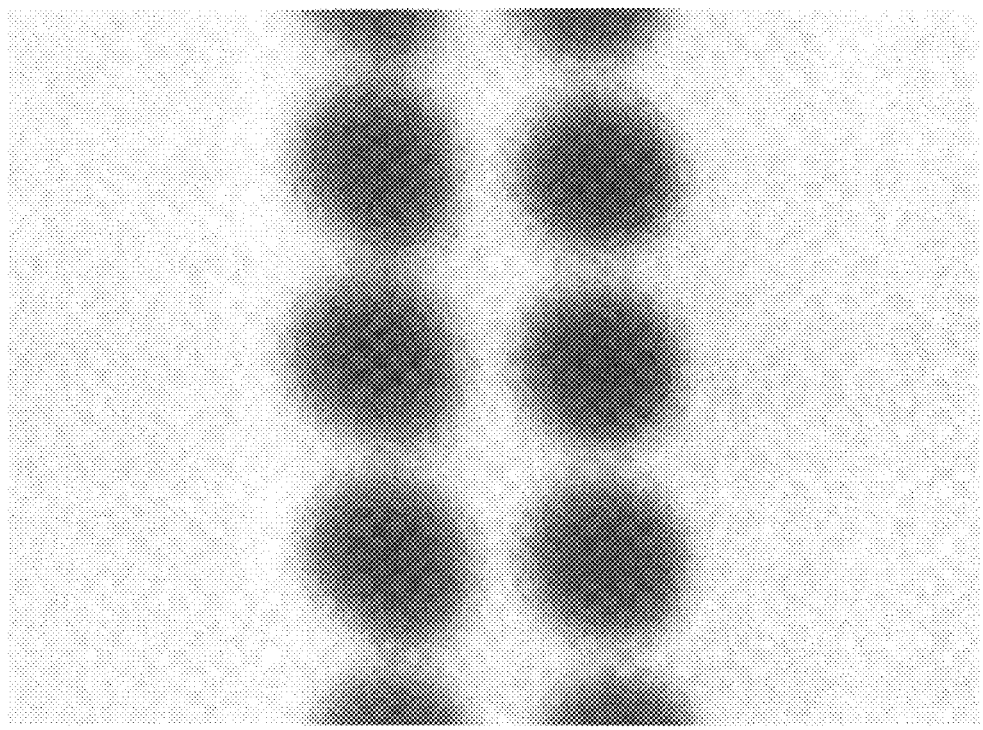
FIG. 8 shows a stereomicroscopic image of a dyed printing formed in Example 60.
Figure 9:
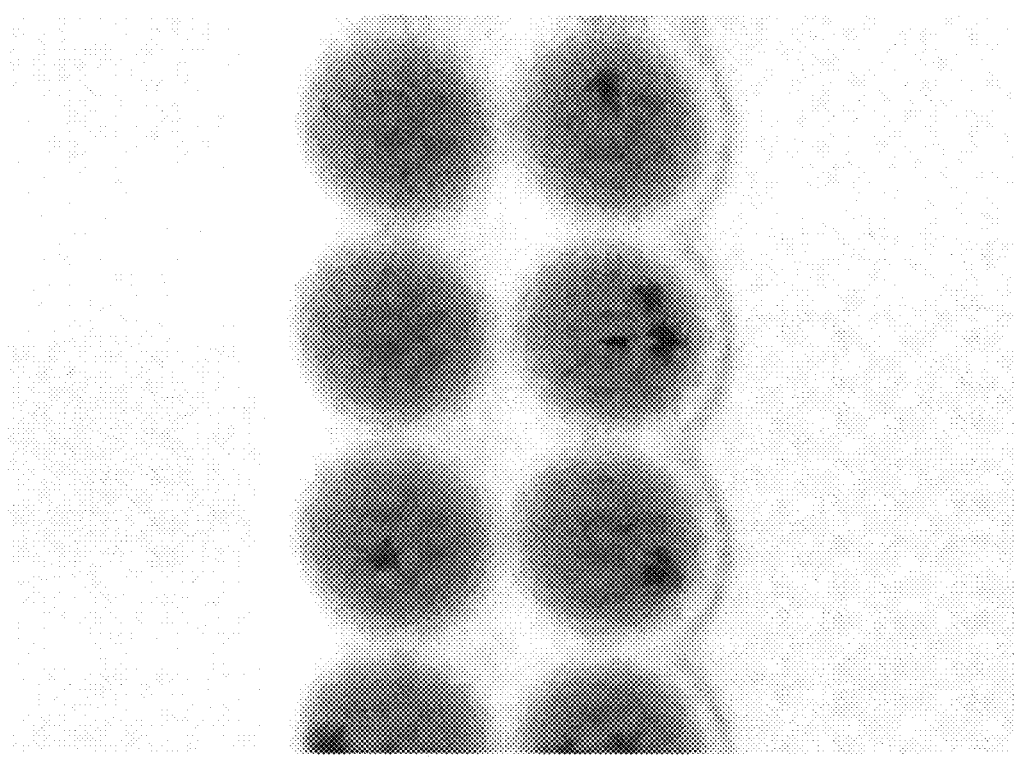
FIG. 9 shows a stereomicroscopic image of a dyed printing formed in Comparative Example 5.
Figure 10:
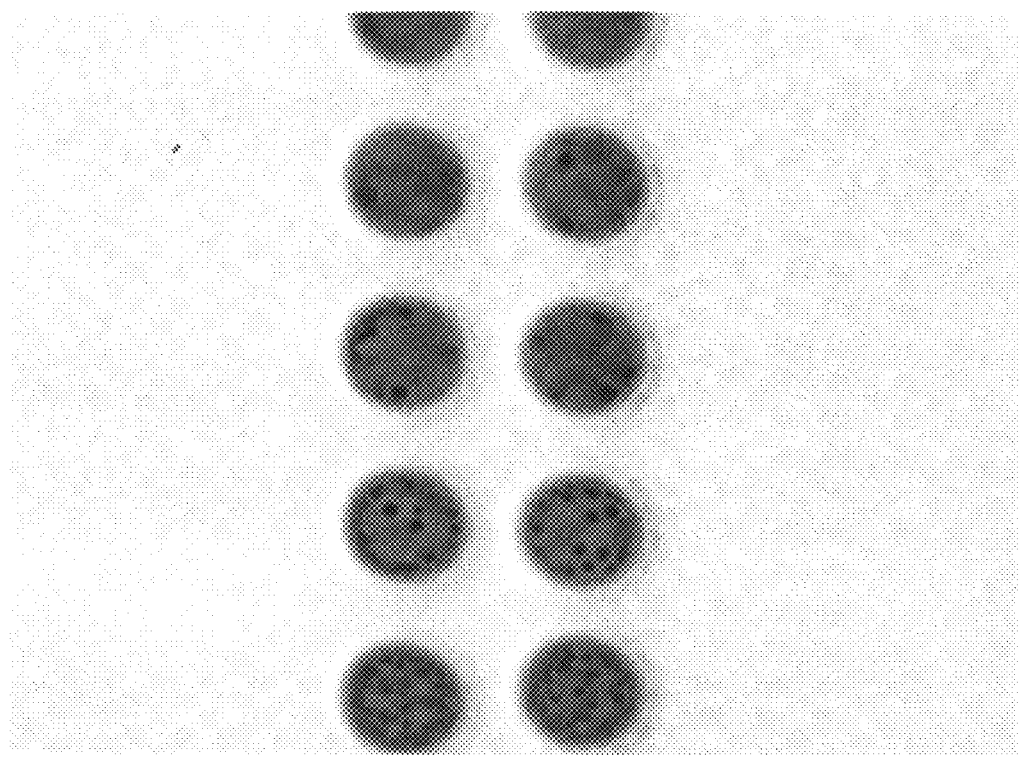
FIG. 10 shows a stereomicroscopic image of a dyed printing formed in Comparative Example 6.
Figure 11:
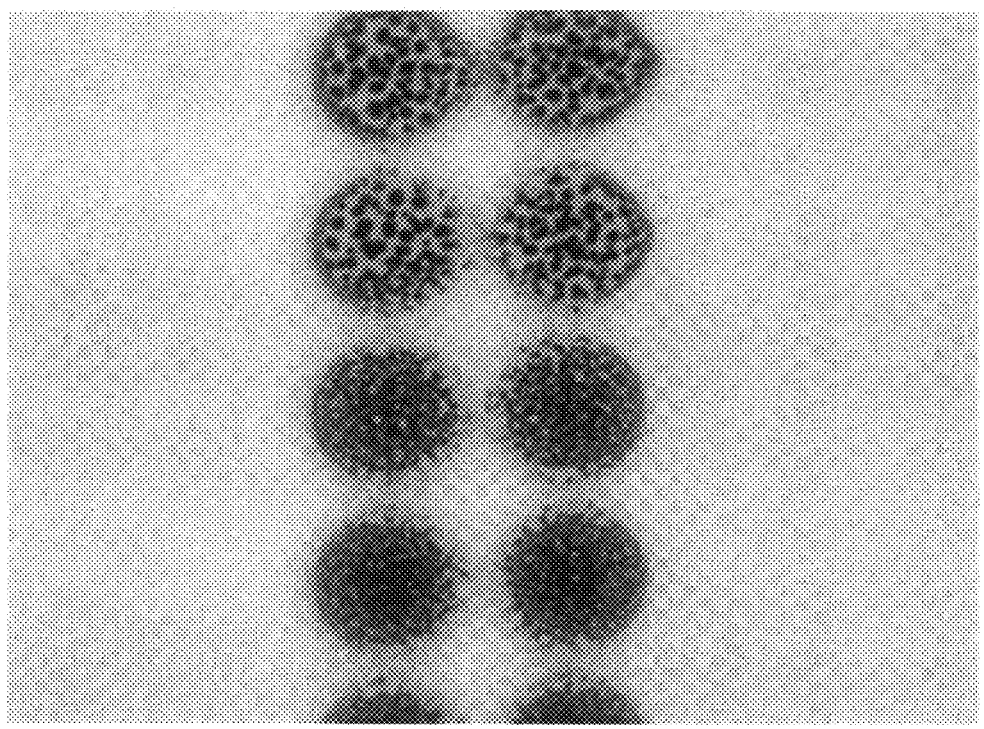
FIG. 11 shows a stereomicroscopic image of a dyed printing formed in Comparative Example 7.
Figure 12:
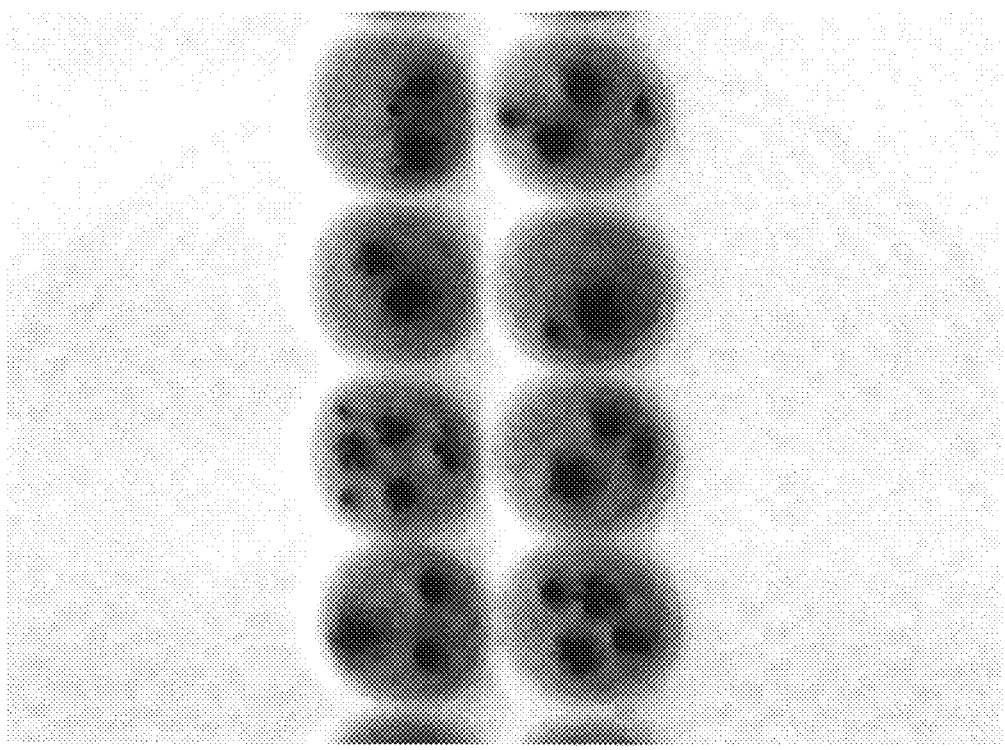
FIG. 12 shows a stereomicroscopic image of a dyed printing formed in Comparative Example 8.
Figure 13:
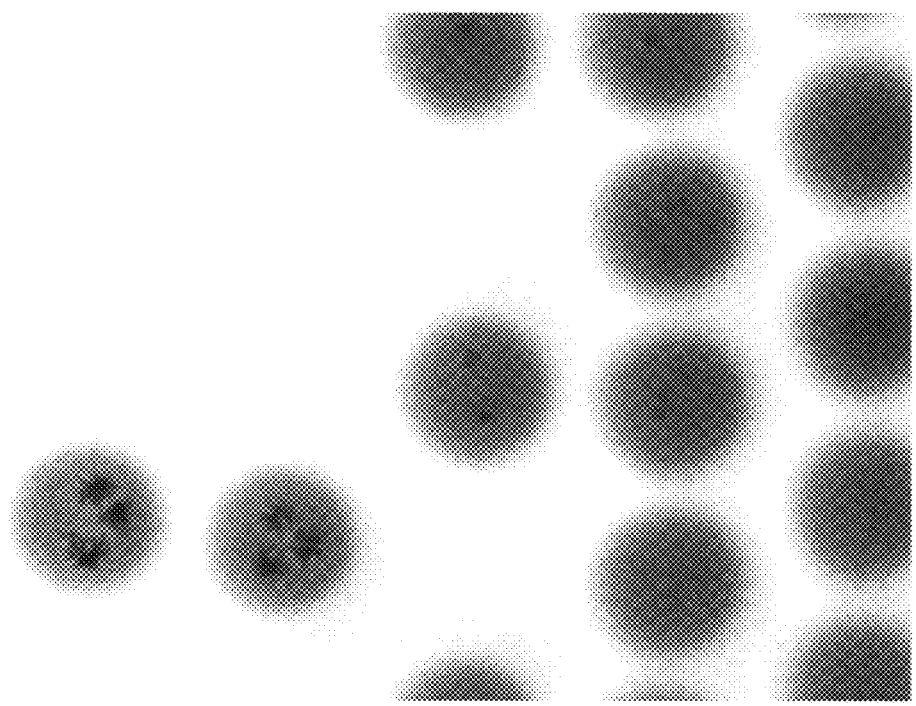
FIG. 13 shows a stereomicroscopic image of a dyed printing formed in Comparative Example 9.

| | Heat applying step | Heat applying time | Distance from incandescent light bulb | Dye composition for ophthalmic lens | Coated shape | Temperature of ophthalmic lens (near the coated area) | | Evaluation | Image |
| --- | --- | --- | --- | --- | --- | --- | --- | --- | --- |
| | | | | | | At initiation of contacting step | At completion of contacting step | | |
| Example 53 | Present | Prior to contacting step | 30 sec | 10 mm | (a) | linear | 65° C. | 35° C. | A | FIG. 1 |
| Example 54 | | | | | (b) | | | | A | FIG. 2 |
| Example 55 | | | | | (c) | | | | A | FIG. 3 |
| Example 56 | | | | | (d) | | | | A | FIG. 4 |
| Example 57 | | | 10 min | 10 mm | (a) | | 95° C. | 45° C. | A | FIG. 5 |
| Example 58 | | | 5 min | 10 mm or less | (a) | | 130° C. | 55° C. | A | FIG. 6 |
| Example 59 | | Concurrent with contacting step | 5 min | 20 mm | (d) | toric | 22° C. | 40° C. | A | FIG. 7 |
| Example 60 | | Concurrent with contacting step and after contacting step | 2 min | 20 mm | (a) | linear | 22° C. | 40° C. | A | FIG. 8 |
| Comparative Example 5 | | Absent | not heated | — | (a) | linear | 22° C. | | C | FIG. 9 |
| Comparative Example 6 | | | | | (b) | | | | C | FIG. 10 |
| Comparative Example 7 | | | | | (c) | | | | C | FIG. 11 |
| Comparative Example 8 | | | | | (d) | | | | C | FIG. 12 |
| Comparative Example 9 | | | | | (d) | toric | | | C | FIG. 13 |

From the results shown in Tables 1 to 4, it was proven that the dye composition for an ophthalmic lens according to the present invention including a reactive dye as the component (A), a radical polymerization initiator as the component (B), and a solvent as the component (C) and/or the monomer (D) is capable of forming on an ophthalmic lens a dyed printing which is significantly superior in elution resistance and durability, as compared with dye compositions not having such a composition. In addition, the dye composition for an ophthalmic lens was revealed to exert desired superior effects even when only either one of the solvent as the component (C) or the monomer (D) is included. Furthermore, even in the case in which a part of the dye composition for an ophthalmic lens is permeated into the lens and cured, a dyed printing having superior elution resistance and durability is obtained similarly to the case in which permeation and curing of the entirety was allowed.

Additionally, as is clear from the results of Examples 53 to 60 shown in Table 5, it was suggested that application of heat on the ophthalmic lens prior to or concomitant with coating of durability, exhibits satisfactory safety; therefore, it can be extensively used for dyeing ophthalmic lenses, as well as contact lenses.

The invention claimed is:

1. A method for producing a colored ophthalmic lens comprising the steps of:
   (1) coating a dye composition for an ophthalmic lens in the form of fine droplets on the surface of an ophthalmic lens to form dots using ink-jet coating equipment, wherein heat is applied to the ophthalmic lens prior to coating the dye composition, the dye composition comprising:
   (A) a dye having at least one group having a carbon-carbon double bond selected from the group consisting of an α, β-unsaturated carbonyl group, a styryl group, a vinylbenzyl group and an allyl group per molecule;
   (B) a radical polymerization initiator; and
   (C) a solvent capable of dissolving at least a part of the component (A) and the component (B), and/or (D) a monomer having at least one radical polymerizable group per molecule;

(2) allowing at least a part of the dye composition for an ophthalmic lens coated to form dots to be permeated into the ophthalmic lens; and (3) polymerizing the dye composition for an ophthalmic lens by applying at least one selected from an active energy ray and heat to the dye composition for an ophthalmic lens.

2. The method for producing a colored ophthalmic lens according to claim 1, wherein after completing permeation of the entirety of the coated dye composition for an ophthalmic lens into the ophthalmic lens in the step (2), an active energy ray is applied to the dye composition for an ophthalmic lens for polymerizing the dye composition for an ophthalmic lens.

3. The method for producing a colored ophthalmic lens according to claim 1, wherein an active energy ray is applied to the dye composition for an ophthalmic lens for polymerizing the dye composition for an ophthalmic lens in the state in which a part of the coated dye composition for an ophthalmic lens is permeated into the ophthalmic lens, and the rest forms an interface with the ambient air.

4. The method for producing a colored ophthalmic lens according to claim 1, wherein the dye composition for an ophthalmic lens is coated on the surface of the ophthalmic lens in a dry state, using an ink-jet coating equipment in the step (1).

5. The method for producing a colored ophthalmic lens according to claim 1, further comprising applying heat to the ophthalmic lens subsequent to step (1).

6. The method for producing a colored ophthalmic lens according to claim 1, wherein the temperature of the ophthalmic lens subsequent to completing step (1) is 30° C. or higher and 90° C. or lower.

7. The method for producing a colored ophthalmic lens according to claim 1, wherein the equilibrium swelling measurement achieved by at least one of the solvent (C) and the monomer (D) of the ophthalmic lens is no less than 40% and no greater than 600%.

8. The method for producing a colored ophthalmic lens according to claim 1, wherein the heat is applied to the ophthalmic lens prior to coating the dye composition for a time period of not shorter than 30 seconds and not longer than 10 minutes.

9. The method for producing a colored ophthalmic lens according to claim 1, wherein a temperature of the ophthalmic lens prior to coating the dye composition is no less than 60° C. and no greater than 135° C.

* * * * *